(12) United States Patent
Langer et al.

(10) Patent No.: US 10,926,219 B2
(45) Date of Patent: Feb. 23, 2021

(54) GAS FILTERS FOR BASIC CONTAMINANTS

(71) Applicant: Serionix, Inc., Champaign, IL (US)

(72) Inventors: James Langer, Urbana, IL (US);
Weihua Zheng, Savoy, IL (US); Erich Diesel, Champaign, IL (US); Chaoyi Ba, Urbana, IL (US); James Economy, Urbana, IL (US); Bita Vaezian, Champaign, IL (US); Xinyu He, Urbana, IL (US)

(73) Assignee: Serionix, Inc., Champaign, IL (US)

( * ) Notice: Subject to any disclaimer, the term of this patent is extended or adjusted under 35 U.S.C. 154(b) by 271 days.

(21) Appl. No.: 15/755,337

(22) PCT Filed: Aug. 26, 2016

(86) PCT No.: PCT/US2016/048994
§ 371 (c)(1),
(2) Date: Feb. 26, 2018

(87) PCT Pub. No.: WO2017/040283
PCT Pub. Date: Mar. 9, 2017

(65) Prior Publication Data
US 2018/0243689 A1     Aug. 30, 2018

Related U.S. Application Data

(60) Provisional application No. 62/211,389, filed on Aug. 28, 2015.

(51) Int. Cl.
*B01D 53/02*     (2006.01)
*B01D 53/82*     (2006.01)
(Continued)

(52) U.S. Cl.
CPC ............. *B01D 53/82* (2013.01); *B01D 53/02* (2013.01); *B01D 53/58* (2013.01); *B01J 20/12* (2013.01);
(Continued)

(58) Field of Classification Search
CPC .......... B01D 2251/502; B01D 2251/70; B01D 2253/102; B01D 2253/104;
(Continued)

(56) References Cited

U.S. PATENT DOCUMENTS

| | | |
|---|---|---|
| 4,547,350 A | 10/1985 | Gesser |
| 4,892,719 A | 1/1990 | Gesser |

(Continued)

FOREIGN PATENT DOCUMENTS

| | | |
|---|---|---|
| CN | 103483955 A | 1/2014 |
| GB | 1532391 A | 11/1978 |

(Continued)

OTHER PUBLICATIONS

International Search Report and Written Opinion of international application PCT/US2016/048994, dated Jan. 24, 2017, 20 pgs.
(Continued)

*Primary Examiner* — Christopher P Jones
(74) *Attorney, Agent, or Firm* — Eversheds Sutherland (US) LLP

(57) ABSTRACT

An example article includes a substrate and a coating applied to the substrate. The coating includes a stabilizer and an organic phosphonic acid reactant. In an example article, the coating includes a water-soluble polymer and an organic phosphate or phosphonate reactant. An example coating configured to be applied to a basic gas filter substrate includes a water-soluble polymer and an organic phosphate or phosphonate reactant. An example technique includes applying a coating to a substrate and heating at least the
(Continued)

coating to a temperature between about 100° C. and about 275° C. for about 1 minute to about 10 minutes. An example system includes a basic gas filter including a coating, and a sensor configured to sense an optical change in the coating.

20 Claims, 17 Drawing Sheets

(51) Int. Cl.
| | |
|---|---|
| *B01D 53/58* | (2006.01) |
| *B01J 20/12* | (2006.01) |
| *B01J 20/22* | (2006.01) |
| *B01J 20/32* | (2006.01) |
| *G01N 31/22* | (2006.01) |
| *C09D 5/00* | (2006.01) |
| *B01J 20/34* | (2006.01) |
| *B01J 20/26* | (2006.01) |
| *C09D 7/63* | (2018.01) |
| *C08K 5/53* | (2006.01) |
| *C08K 5/52* | (2006.01) |

(52) U.S. Cl.
CPC ............ *B01J 20/22* (2013.01); *B01J 20/261* (2013.01); *B01J 20/267* (2013.01); *B01J 20/327* (2013.01); *B01J 20/3248* (2013.01); *B01J 20/3293* (2013.01); *B01J 20/3425* (2013.01); *B01J 20/3458* (2013.01); *C09D 5/00* (2013.01); *C09D 7/63* (2018.01); *G01N 31/221* (2013.01); *B01D 2251/512* (2013.01); *B01D 2251/70* (2013.01); *B01D 2253/102* (2013.01); *B01D 2253/104* (2013.01); *B01D 2253/106* (2013.01); *B01D 2253/108* (2013.01); *B01D 2253/11* (2013.01); *B01D 2253/1124* (2013.01); *B01D 2253/202* (2013.01); *B01D 2253/204* (2013.01); *B01D 2253/25* (2013.01); *B01D 2257/406* (2013.01); *B01D 2257/708* (2013.01); *B01D 2258/06* (2013.01); *B01D 2259/40088* (2013.01); *B01D 2259/4508* (2013.01); *C08K 5/52* (2013.01); *C08K 5/53* (2013.01)

(58) Field of Classification Search
CPC ........ B01D 2253/106; B01D 2253/108; B01D 2253/11; B01D 2253/1124; B01D 2253/202; B01D 2253/204; B01D 2253/25; B01D 53/02; B01D 53/58; B01D 53/82; B01J 20/12; B01J 20/22; B01J 20/261; B01J 20/267; B01J 20/3248; B01J 20/327; B01J 20/3293; B01J 20/3425; B01J 20/3458
See application file for complete search history.

(56) References Cited

U.S. PATENT DOCUMENTS

| | | | |
|---|---|---|---|
| 5,354,817 | A | 10/1994 | Usuki et al. |
| 5,607,647 | A | 3/1997 | Kinkead |
| 5,783,608 | A | 7/1998 | Sugo et al. |
| 5,830,414 | A | 11/1998 | Ishii et al. |
| 5,944,878 | A | 8/1999 | Curt |
| 6,009,739 | A | 1/2000 | Kunio et al. |
| 6,071,479 | A | 6/2000 | Marra et al. |
| 6,187,596 | B1 | 2/2001 | Dallas et al. |
| 6,228,135 | B1 | 5/2001 | Sugo et al. |
| 6,447,584 | B1 | 9/2002 | Oleg et al. |
| 6,706,361 | B1 | 3/2004 | Economy et al. |
| 6,802,891 | B2 | 10/2004 | Kritzler |
| 6,872,241 | B2 | 3/2005 | Soane et al. |
| 7,022,158 | B2 | 4/2006 | Seguin et al. |
| 7,025,809 | B2 | 4/2006 | Chen et al. |
| 7,029,516 | B2 | 4/2006 | Campbell et al. |
| 7,232,475 | B2 | 6/2007 | Kritzler |
| 7,341,618 | B2 | 3/2008 | Bayer et al. |
| 7,427,409 | B2 | 9/2008 | Gooch et al. |
| 7,442,237 | B1 | 10/2008 | Gardner |
| 8,211,218 | B2 | 7/2012 | Dallas et al. |
| 8,221,712 | B2 | 7/2012 | Vorberg et al. |
| 8,293,333 | B2 | 10/2012 | Croll et al. |
| 2003/0069378 | A1 | 4/2003 | Sanduja et al. |
| 2003/0116022 | A1 | 6/2003 | Kritzler et al. |
| 2004/0121688 | A1 | 6/2004 | Edens et al. |
| 2004/0250683 | A1 | 12/2004 | Soane et al. |
| 2005/0092176 | A1 | 5/2005 | Ding et al. |
| 2005/0126393 | A1 | 6/2005 | Chen et al. |
| 2005/0132886 | A1 | 6/2005 | Schultze et al. |
| 2006/0042209 | A1 | 3/2006 | Dallas et al. |
| 2006/0042210 | A1 | 3/2006 | Dallas et al. |
| 2006/0130451 | A1 | 6/2006 | Ding et al. |
| 2006/0214137 | A1 | 9/2006 | Schlosser |
| 2006/0231487 | A1 | 10/2006 | Bartley et al. |
| 2007/0065951 | A1 | 3/2007 | Soldatov et al. |
| 2008/0026025 | A1 | 1/2008 | Gooch et al. |
| 2010/0018396 | A1 | 1/2010 | Ding et al. |
| 2010/0233048 | A1 | 9/2010 | Dallas et al. |
| 2013/0008308 | A1* | 1/2013 | Govindappa ........ B01D 46/002 95/20 |
| 2015/0107203 | A1 | 4/2015 | Ichikawa et al. |

FOREIGN PATENT DOCUMENTS

| | | | |
|---|---|---|---|
| JP | 6312315 | A | 1/1988 |
| JP | 0360710 | A | 3/1991 |
| JP | 0360711 | A | 3/1991 |
| JP | 03161020 | A | 7/1991 |
| JP | H03161020 | A | 7/1991 |
| JP | 2002028427 | A | 1/2002 |
| JP | 2003275530 | A | 9/2003 |
| JP | 2012125717 | A | 7/2012 |
| WO | 9745189 | A1 | 12/1997 |
| WO | 1997045189 | A1 | 12/1997 |
| WO | 0010687 | A1 | 3/2000 |
| WO | 2000010687 | A1 | 3/2000 |
| WO | 0170391 | A1 | 9/2001 |
| WO | 2001070391 | A1 | 9/2001 |
| WO | 03001213 | A2 | 1/2003 |
| WO | 2015103593 | A1 | 7/2015 |

OTHER PUBLICATIONS

Strommen et al., "The Trapping of Indoor Air Contaminants," Central European Journal of Chemistry, vol. 9, No. 3, Feb. 22, 2011, pp. 404-409.

Avary et al., "Amine Contamination Monitoring and Control at the Advanced Mask Technology Center," Advanced Mask Technology Center, 2005 (Applicant points out, in accordance with MPEP 609.04(a), that the year of publication, 2005, is sufficiently earlier than the effective U.S. filing date, 2018, so that the particular month of publication is not in issue.) 6 pp.

Luna et al., "Evaluation of Commercial Off-the-Shelf Sorbents and Catalysts for Control of Ammonia and Carbon Monoxide," 40th International Conference on Environmental Systems, Jul. 11-15, 2010, 15 pp.

International Preliminary Report on Patentability from International Application No. PCT/US2016/048664, dated Mar. 15, 2018, 14 pp.

Communication Pursuant to Rules 161(1) and 162 EPC dated Mar. 21, 2018, from counterpart European Application No. 16771025.0, 3 pp.

Response to Communication pursuant to Rules 161(1) and 162 EPC dated Mar. 21, 2018, from counterpart European Application No. 16771025.0, filed Sep. 18, 2018, 4 pp.

\* cited by examiner

Methyl Orange

Bromophenol Blue

Methyl Red

Bromocresol Green

GAS FILTERS FOR BASIC CONTAMINANTS

This application is a national stage application under 35 U.S.C. § 371 of International Application number PCT/US2016/048994, filed Aug. 26, 2016, which claims the benefit of U.S. Provisional Application No. 62/211,389 filed Aug. 28, 2015, each of which are incorporated herein by reference in their entirety.

TECHNICAL FIELD

The present disclosure generally relates to articles and systems for filtering basic contaminants from a gas.

BACKGROUND

The presence of basic gases in air may cause many problems. In precision manufacturing environments such as a semiconductor cleanroom for manufacturing microelectronics, as low as 1 to 2 parts per billion of basic gases such as amines (e.g. ammonia or $NH_3$, trimethylamine, N-Methyl-2-pyrrolidone) may act as Airborne Molecular Contaminations (AMCs), and may cause a defect known as T-topping on chemical amplified resists (CARs) during Deep Ultraviolet wavelength (DUV) exposure. Fuel cells that use acid electrolytes, such as phosphoric acid, may suffer performance decay when the fuel contains more than 1.0 ppm, by volume, of ammonia gas. In the International Space Station (ISS), ammonia originating either from animals' facility (e.g. rodents) or leaking from the thermal control system may pose health risks to astronauts. Toxicology experts have lowered the Space Maximum Allowable Concentration (SMAC) of $NH_3$ to 7 $ppm^2$. $NH_3$ is also largely responsible for unpleasant odors associated with pets (e.g. cat, dog, mice), which may persist in homes or environments housing pets. $NH_3$ and other basic gases are moderately toxic. In addition, as a main component in both fertilizer plant and refrigeration sites, $NH_3$ leaks or explosions present serious hazards to first responders and workers.

SUMMARY

In general, the present disclosure describes example articles and techniques for filtering basic contaminants from gases, for example, air.

In an example, the disclosure describes an example article including a substrate, and a coating applied to the substrate. The coating includes a stabilizer and an organic phosphonic acid reactant. A color changing dye may be applied to indicator the life time and status of the media.

In an example, the disclosure describes an example article including a fibrous substrate, and a coating applied to the fibrous substrate. The coating includes poly (2-acrylamido-2-methyl-1-propanesulfonic acid) and at least one of phytic acid (also known as IP6), amino tris(methylene phosphonic acid) (also known as ATMP or NMPTA), and etidronic acid. The weight ratio of the stabilizer to the at least one of phytic acid, amino tris(methylene phosphonic acid), and etidronic acid may be about 0.2:1. The molecular weight of the water-soluble polymer may range from about 1 million to about 10 million.

In an example, the disclosure describes an example coating configured to be applied to a basic gas filter substrate. The coating may include poly (2-acrylamido-2-methyl-1-propanesulfonic acid) and at least one of phytic acid, amino tris(methylene phosphonic acid), and etidronic acid. The weight ratio of the stabilizer to the at least one of phytic acid, amino tris(methylene phosphonic acid), and etidronic acid may be about 0.2:1. The molecular weight of the water-soluble polymer may range from about 1 million to about 10 million.

In an example, the disclosure describes an example article including a substrate, and a coating applied to the substrate. The coating includes a water-soluble polymer and one or both of an organic phosphate reactant or phosphonate reactant.

In an example, the disclosure describes an example article including a fibrous substrate and a coating applied to the fibrous substrate. The coating includes polyvinyl alcohol and an organic phosphonate reactant including at least one of phytic acid and amino tris(methylene phosphonic acid). The weight ratio of polyvinyl alcohol to the organic phosphonate reactant may be between about 0.25 and about 1. The molecular weight of polyvinyl alcohol may range from about 10,000 to about 100,000 or from about 30,000 to about 50,000.

In an example, the disclosure describes an example coating configured to be applied to a basic gas filter substrate. The coating may include polyvinyl alcohol and an organic phosphonate reactant including at least one of phytic acid and amino tris(methylene phosphonic acid). The weight ratio of polyvinyl alcohol to the organic phosphonate reactant may be between about 0.1 and about 1. The molecular weight of polyvinyl alcohol may range from about 10,000 to about 100,000.

In an example, the disclosure describes an example technique including applying a coating to a substrate. The technique also includes heating at least the coating to a temperature between about 125° C. to about 275° C. for about 1 minute to about 10 minutes. The coating comprises a water-soluble polymer and one or both of an organic phosphate reactant or a phosphonate reactant.

In an example, the disclosure describes a method for regenerating a basic gas filtration capacity of a coating applied to a substrate. The method may include subjecting the coating to at least one thermal cycle. The at least thermal cycle may include heating the coating to a temperature between about 70° C. and about 175° C. for a time from about 30 minutes to about 3 hours. The coating may include a water-soluble polymer and an organic phosphate reactant.

In an example, the disclosure describes an example article including a fibrous substrate, and a coating applied to the fibrous substrate. The coating includes polyacrylamide and 1-hydroxyethane 1,1-diphosphonic acid (also known as etidronic acid or HEDP). The molecular weight of the polyacrylamide may range from about 1 million to about 50 million. The coating includes a color changing dye including one or more of cresol red, metanil yellow, m-cresol purple, bromophenol blue, and benzopurpurine 4B.

In an example, the disclosure describes an example article including a substrate and a coating applied to the substrate. The coating may include a stabilizer and an organic acid reactant. The organic acid reactant may include one or both of citric acid and malonic acid.

In an example, the disclosure describes an example article including a substrate and a coating applied to the substrate. The coating may include a water-soluble polymer including one or both of poly(2-acrylamido-2-methyl-1-propanesulfonic acid) and a copolymer of at least a 2-acrylamido-2-methyl-1-propanesulfonic acid monomer and one or both of maleic acid monomer and acrylic acid monomer. The may include a pH indicator.

In an example, the disclosure describes an example system including a basic gas filter including a coating on a substrate. The example system includes a sensor configured to sense an optical change in the coating.

The details of one or more aspects of the invention are set forth in the accompanying drawings and the description below. Other features, objects, and advantages of the invention will be apparent from the description and drawings, and from the claims.

BRIEF DESCRIPTION OF DRAWINGS

The foregoing and other aspects of this invention are made more evident in the following Detailed Description, when read in conjunction with the attached Drawing Figures, wherein.

It should be understood that features of certain Figures of this disclosure may not necessarily be drawn to scale, and that the Figures present non-exclusive examples of the techniques disclosed herein.

DETAILED DESCRIPTION

Basic contaminants may be removed from a gas, for example, air or an enclosed atmosphere using air filtration systems that may be part of (heating, ventilation, and air conditioning (HVAC) systems. Systems for removing basic contaminants from a gas may include a chemical filter that includes strong acid ion-exchange resins, activated carbon, or acid-impregnated activated carbon, or their mixtures. However, known systems and techniques may not exhibit sufficient capacity, may not be stable over relatively longer time periods, and may be expensive, among other disadvantages.

Example articles according to the present disclosure may provide advantages such as a higher capacity for removal of bases at low concentration ranges, maintaining baseline performance for a longer time (better breakthrough performance), better mass transfer within the working conditions provided by the efficiency of contact, lower costs, lower carbon or energy footprint, and an indication of remaining filter life or of filter failure.

Figure 1A:
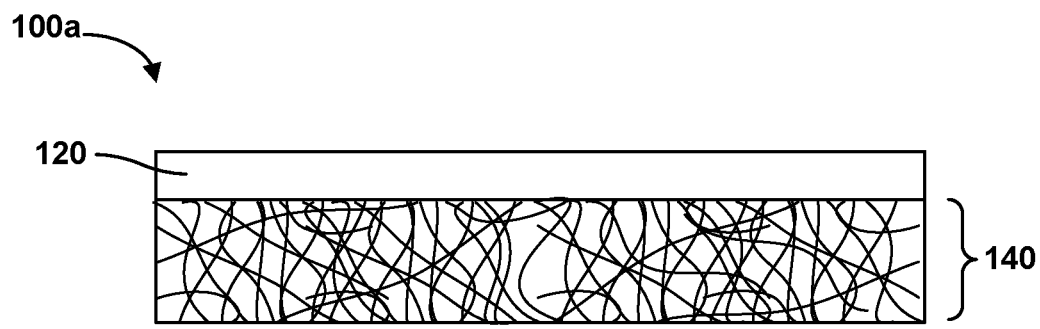
FIGS. 1A-1C are conceptual diagrams illustrating a cross sectional view of an example article for filtering basic contaminants from a gas.
Figure 1B:
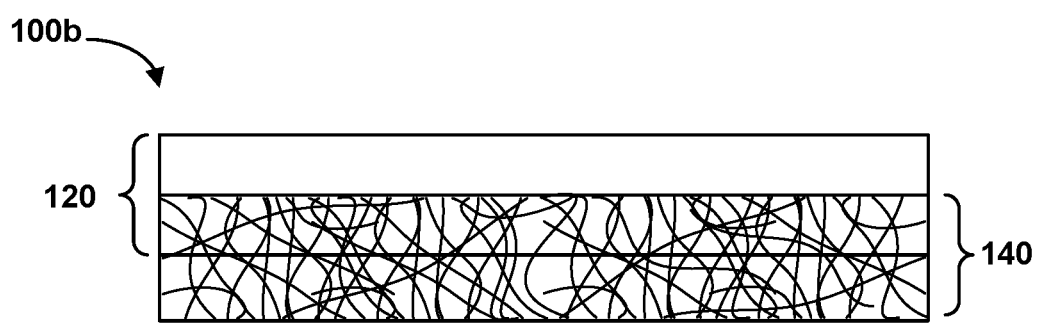
Figure 1C:
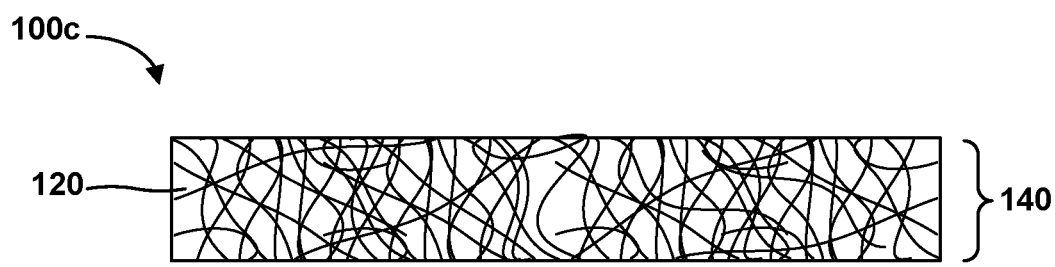

FIGS. 1A-1C are conceptual diagrams illustrating a cross sectional view of an example article for filtering basic contaminants from a gas. As shown in FIG. 1A, an example article 100a includes a substrate 140, and a coating 120 applied to substrate 140. Coating 120 may include a stabilizer and an organic acid reactant. The organic acid reactant may attract basic gas molecules or may react with them, resulting in their capture, filtration, absorption, adsorption, or otherwise, removal from the air surrounding the article 100a. In examples, the organic acid reactants may include one or more of clodronic acid, medronic acid, succinic acid, citric acid, glycolic acid, malonic acid, tartaric acid, fumaric acid, sorbic acid, lactic acid, and malic acid. In some examples, the organic acid reactant may include an organic phosphonic acid reactant. In examples, the organic phosphonic acid reactant includes at least one of phytic acid (IP6), amino tris(methylene phosphonic acid) (ATMP), and etidronic acid (HEDP). Preferably, the organic phosphonic acid reactant is substantially free of volatile organic acids, volatile mineral acids, and formaldehyde.

The stabilizer may stabilize coating 120, for example, by preventing flowing or drifting of coating 120. The stabilizer may also enhance the shelf-life of the coating. In examples, the stabilizer may include a water-soluble polymer. The water soluble polymer may increase the viscosity of coating 120, contributing to stabilization. The polymer may also attract or capture moisture from the atmosphere, maintaining at least a minimum amount of water in coating 120. The water may promote the capture and neutralization of basic gases such as $NH_3$ from the surrounding atmosphere. The water-soluble polymer may include polyelectrolytes, copolymers, and cross-linked polymers. For example, cross-linked polymers may exhibit significant resistance to flow of coating composition 120. The water-soluble polymer may include, for example, at least one of polyacrylamide, polyacrylic acid, polyvinyl alcohol, polystyrene sulfonic acid and poly (2-acrylamido-2-methyl-1-propanesulfonic acid) (PAMPS), other poly(sulfonic acids), poly(phosphonic acids), and copolymers thereof. Cross-linkable polymers may be used so that once cross-linked by thermal, chemical, ionic or photo methods, the coating materials may be fixed and thus stabilized onto the substrate. Drifting of the coating materials at high relative humidity environments over time may thus be prevented. Cross-linkable polymers may include one or more of polyacrylamide (PAM), poly(N-hydroxylmethylacrylamide) (PNHMA), poly(N-hydroxylmethylacrylamide-co-2-acrylamido-2-methyl-1-propanesulfonic acid) (PNHMA/PAMPS), poly(diacetone acrylamide) (PDAAM), poly(diacetone acrylamide-co-2-acrylamido-2-methyl-1-propanesulfonic acid) (PDAAM/PAMPS), polymers of NHMA, PAM, DAAM, vinyl sulfonic acids, vinyl phosphonic acids (for example, polyvinylphosphonic acid), acrylic acid, carboxylic acids, and copolymers thereof. In some examples, the water-soluble polymers may include celluloses, hydrocolloids, and gums. For example, the water soluble polymers may include one or more of carboxymethylcellulose, hydroxypropylcellulose, and xanthan gum. The copolymers contain 5 to 30 wt % of cross-linkable component, e.g. PNHMA, PAM or PDAAM. PNHMA can be cross-linked at high temperature. PDAAM can form a cross-linked hydrogel with adipic acid dihydrazide (ADH). PAM can be partially hydrolyzed and cross-liked at acid conditions. PNHMA and PDAAM/PAMPS may form stable cross-linked structure at elevated temperatures.

In some examples, the stabilizer may include an inorganic stabilizer. In some examples, the inorganic stabilizer may include one or more of clay, nanoclay, montmorillonite, bentonite, or colloidal silica.

In examples, the molecular weight of the water-soluble polymer may range from about 1 million to about 20 million, or preferably from about 5 million to about 10 million, or less than about 5 million, or less than about 1 million. In examples, the stabilizer may also perform as a reactant that captures basic gas components. For example, the stabilizer may include the organic phosphonic acid reactant, for example, phosphonic acid reactant groups and may both stabilize the composition 120 and react with and capture basic gas components such as $NH_3$. In an example, the weight ratio of the stabilizer to the organic phosphonic acid reactant ranges from about 0.1:1 to about 2:1, and preferably, is about 0.2:1.

In some examples, coating 120 may include a preservative. In some examples, the preservative may include dehydroacetic acid.

In examples, coating 120 may include a pH indicator. pH indicators may help indicate breakthrough of the article 100a because coating 120 may exhibit a pH change as it progressively captures basic gas components such as $NH_3$. Preferably, a pH indicator should have a stable and bright color during storage and a sharp and apparent color change at a predetermined change in pH that may correspond to parameters such as, for example, remaining capacity of the article 100a or concentration of base breaking through the filter. The pH indicator should preferably not negatively impact the filter performance. In examples, the pH indicator may be uniformly dispersed through coating 120. In examples, the pH indicator is disposed within a predetermined volume or region of coating 120. For example, the pH indicator may be disposed within a volume of the coating having a square, circular, oval, rectangular, or any other suitable surface area boundary. In examples, the pH indicator comprises at least one of cresol red, crystal violet, malachite green, bromophenol blue, bromocresol green, phenol red, thymol blue, lacmoid, methyl orange, methyl red, 2-(4-dimethylaminophenylazo)pyridine, 2-aminoazotoluene, quinaldine red, benzopurpurine 4B, methyl yellow, 4,4'-bis(4-amino-1-naphthylazo)-2,2'-stilbenesulfonic acid, metanil yellow, 4-(phenylazo)diphenylamine, m-cresol purple, tropaeolin OO, 3',3",5',5"-tetrabromophenolphthalein ethyl ester potassium salt, and 4-dimethylamino-2-methylazobenzene. Among these indicators, bromocresol green, bromophenol blue, benzopurpurine 4B, thymol blue, m-cresol purple, metanil yellow, and m-cresol red are preferred for their relatively high stability, proper pH change range, bright color and sharp color change at breakthrough. In some examples, the pH indicator may include m-cresol purple. In some examples, the pH indicator may include m-cresol purple and at least one of bromophenol blue and bromocresol green. In examples, the pH indicator may include thymol blue and bromocresol green in a ratio of about 3:1 by weight.

Substrate 140 may include a woven, nonwoven, foam, porous, solid, or any other suitable substrate. In examples, substrate 140 may include one or more of fibers, granules, beads, monoliths (for example, carbon monoliths, or inorganic monoliths such as clay monoliths), or powders. As shown in FIG. 1A, substrate 140 may include a fibrous substrate. In examples, the substrate includes at least one of a non-woven web, glass fiber, paper, polymer, activated carbon, textile, cellulosic fiber, and cotton. In examples, substrate 140 may allow a flowing gas to pass through a major surface of substrate 140. In examples, substrate 140 may allow a flowing gas to pass along a major surface. In some examples, substrate 140 may include one or more of a pleated sheet, an array of sheets, a packed bed, a honeycomb structure, or a flat sheet.

In the example shown in FIG. 1A, coating 120 may be disposed on a major surface of substrate 140. However, as shown in FIG. 1B, an example article 100b may include a coating 120 that at least partly impregnates substrate 140. For example, coating 120 may enter and occupy a volume within a bulk region of substrate 140. Coating 120 may be impregnated into substrate 140. Substrate 140 may be wetted with a coating composition, or with separate solutions of each component of the composition which may wick into the support, followed by removal of the solvent (typically, water). The solvent may be removed, and preferably, is substantially completely removed after substrate 140 is impregnated with coating 120. In an example, as shown in FIG. 1C, an example article 100c may include a coating 120 that impregnates a substantial bulk of substrate 140. For example, in examples where substrate 140 includes a fibrous substrate, coating 120 may completely penetrate the bulk of substrate 140, and may coat surfaces of fibers of the fibrous substrate. In examples, coating 120 may coat at least surfaces of fibers of the fibrous substrate. Coatings may also be applied to impregnate or coat the internal or external surfaces of porous materials comprising small size (nm to μm) pores, such as activated alumina, boehmite, bayerite, zirconia, titania, ceria, silica, silicon carbide calcium oxide, magnesium oxide, hydrotalcites, spinels, carbon nanotubes, activated carbon, a metal oxide of main group IIa oxide, boron oxide, Perovskites, clays, zeolites, MOFs, inorganic-organic hybrid materials, organic or inorganic polymers and combinations thereof.

Figure 2A:
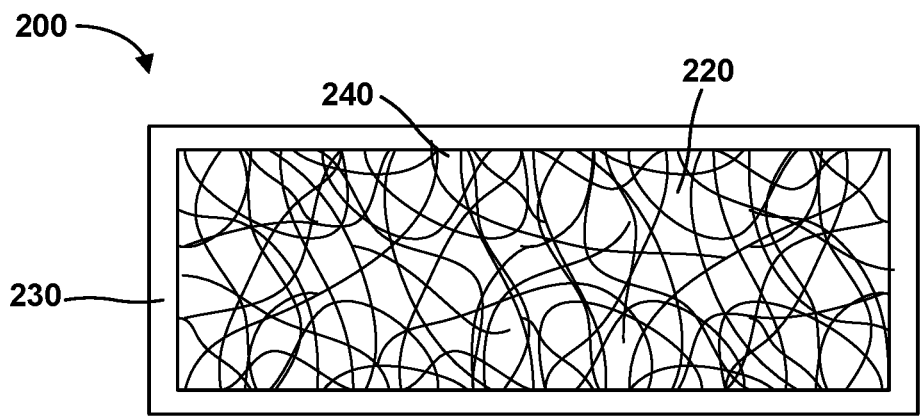
FIG. 2A is a conceptual diagram illustrating a top view of an example basic gas filter for filtering basic contaminants from a gas.

FIG. 2A is a conceptual diagram illustrating a top view of an example basic gas filter for filtering basic contaminants from a gas. In an example, a basic gas filter 200 includes a frame 230 holding a substrate 240. A coating 220 is disposed on at least a major surface of substrate 240. Substrate 240 may include substrate 140 described above with reference to FIG. 1A. Coating 220 may include coating 120 described above with respect to FIG. 1A. Basic components may be extracted, removed or filtered from air by passing air across or along a surface of basic gas filter 200. Coating 220 may interact with, for example, attract, react, or otherwise capture, basic gas components from air. Basic gas filter 200 may be used in HVAC systems, personal ventilation systems, air or gas filtration systems, masks, or any other system or application for removal of basic contaminants from a gas. In examples, substrate 240 may include a label. For example, coating 220 applied to substrate 240 may together form a label. The label may undergo a visual or optical change upon sufficient exposure to a gas including basic contaminants. The label may be separate from or integrated with a primary filtration medium of basic gas filter 200.

Figure 2B:
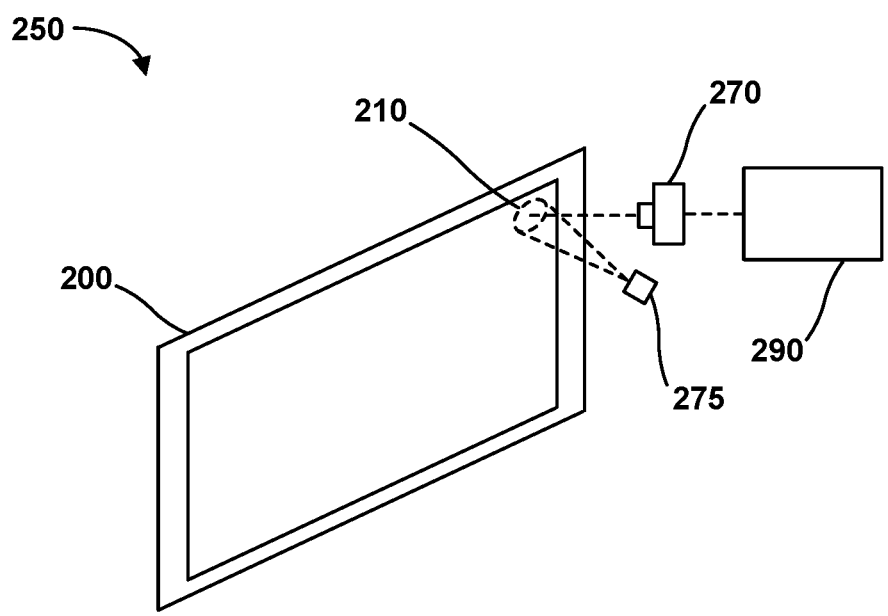
FIG. 2B is a conceptual diagram illustrating an example system including an example basic gas filter for filtering basic contaminants from a gas, and a sensor.

FIG. 2B is a conceptual diagram illustrating an example system 250 including basic gas filter 200 for filtering basic contaminants from a gas and a sensor 270. In examples, sensor 270 may include one or more of an optical sensor, a light sensor, an image sensor, or a camera, a charge coupled device (CCD), photovoltaics, photodiodes, and complementary metal-oxide semiconductor (CMOS), and may sense an optical property of a region 210 of basic gas filter 200. In some examples, the optical property may include one or more of color, hue, saturation, intensity, reflectivity, appearance, refractive index, absorbance, fluorescence, and/or phosphorescence, or other suitable optical property of basic gas filter 200 that may be indicative of a status of basic gas filter. In some examples, sensor 270 may sense one or more of x-ray, ultraviolet, visual, near-infrared, or infrared wavelengths. In some examples, system 250 may include a source 275 that may emit one or more of x-ray, ultraviolet, visual, near-infrared, or infrared wavelengths over region 210 of basic gas filter 200. In some examples, a light ray emitted by source 275 may interact with, for example, by one or more of complete or partial reflection, refraction, absorption, diffusion with basic gas filter 200, and sensor 270 may sense light originating from source 270 after the light interacts with basic gas filter 200. In some examples, sensor 270 may sense a color change of a pH indicator in basic gas filter 200. In some examples, sensor 270 may generate a signal indicative of an optical change in basic gas filter 200, for example, a color change.

In some examples, source 275 may include one or more of sunlight, incandescent, halogen, fluorescent, light-emitting diode, organic light-emitting diode, laser, or a combustion source. In some examples, one or both of sensor 270 and source 275 may be powered by a power source, for example, AC or DC power source, batteries, photovoltaics, piezoelectric devices, fuel cells, capacitors, turbine-driven generators, radio- or microwave-frequency energy harvesters, thermoelectrics, or a combination thereof. In some examples, system 250 may not include source 275, and sensor 270 may sense ambient light interacting with region 210 of basic gas filter 200.

In some examples, system 250 may include a computing device 290. Computing device 290 may receive signals generated by sensor 270 by sensing region 210 that may be indicative of a status of basic gas filter 200. Sensor 270 may send signals to computing device 290 may a wired or wireless connection, for example, through a wire, cable, fiber optic, or other communication medium, or by a wireless communication protocol, for example, WiFi, Bluetooth, or other suitable wireless communication. In some examples, system 250 may not include a separate computing device, and instead, computing device 290 may be integrated in sensor 270. Computing device 290 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, computing device 290 may be remote from basic gas filter 200 and sensor 270. In some examples, computing device 290 may execute modules to analyze signals received from sensor 270 to determine the status of basic gas filter 200. In some examples, computing device 290 may output a signal indicative of a status of basic gas filter 200. In some examples, sensor 270 may analyze the sensed signals, and output a signal indicative of a status of basic gas filter 200. The signal indicative of the status may include one or more of a visible or audible alert, for example, a light, an icon, an alert tone, an alert message, or a digital communication encoding the status.

Figure 2C:
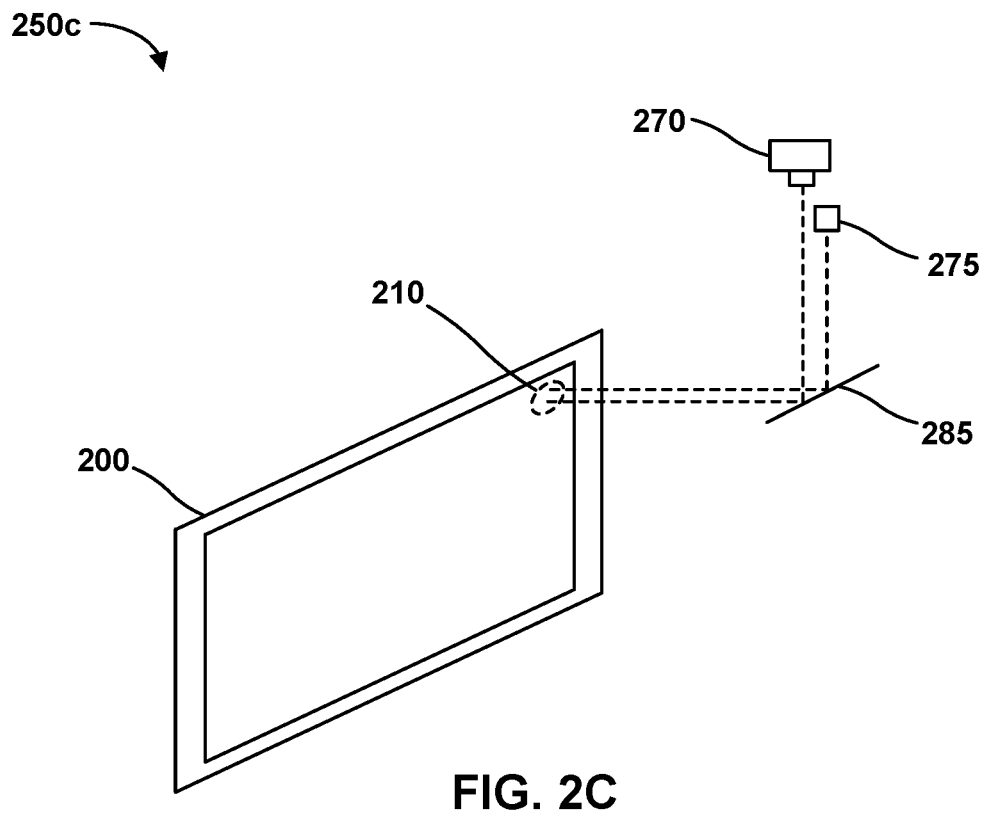
FIG. 2C is a conceptual diagram illustrating an example system including an example basic gas filter, a sensor, and an optical element.

While in the example of FIG. 2B, source 275 and sensor 270 are adjacent the same surface of basic gas filter 200, in other examples, source 275 and sensor 270 may be disposed adjacent opposite surfaces of basic gas filter, so that sensor 270 detects light transmitted through or across basic gas filter 200. In some examples, one or both of source 270 or sensor 275 may have a direct line of sight to region 210. In some examples, one or both source 270 or sensor 275 may have an indirect line of sight to region 210, for example, through an optical path that may be deflected by one or more optical elements. FIG. 2C is a conceptual diagram illustrating an example system 250c including basic gas filter 200 for filtering basic contaminants from a gas, sensor 270, and an optical element 285. As shown in FIG. 2C, one or both of source 275 and sensor 270 may have an indirect line of sight to region 210 through optical element 285. In some examples, optical element 285 may include one or more of a mirror, a prism, a diffraction grating, or an optical filter.

In some examples, region 210 may be static or dynamic. For example, one or both of source 275 or sensor 270 may move or reposition, for example, by a motor or other displacement mechanism to sense different regions of basic gas filter 200. In some examples, region 210 may include a portion of a surface of basic gas filter 200. In some examples, region 210 may include substantially an entire surface of basic gas filter 200.

In some examples, the optical property may be indicative of filter status, for example, one or more of saturation, breakthrough, contamination, capacity, presence or absence of one or more predetermined chemical species in basic filter 200 that may have been absorbed from air, or amount of a chemical or contaminant removed by basic gas filter 200.

Figure 2D:
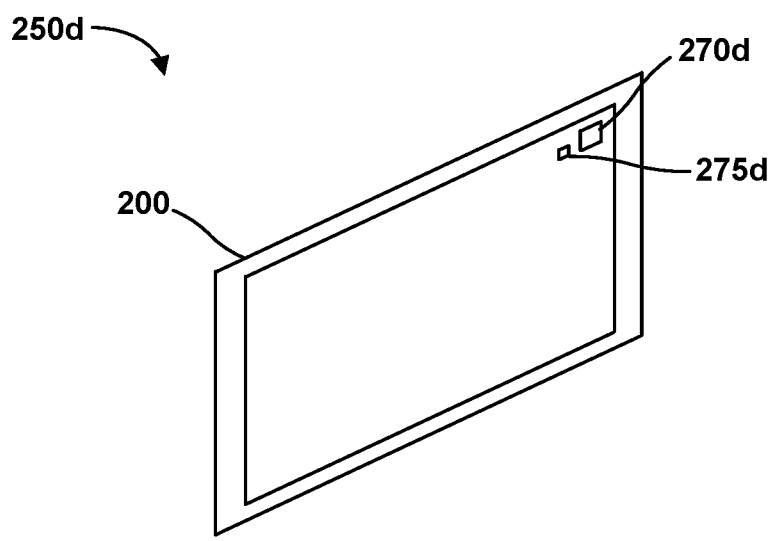
FIG. 2D is a conceptual diagram illustrating an example system including an example basic gas filter, and an embedded sensor.

FIG. 2D is a conceptual diagram illustrating an example system 250d including basic gas filter 200 for filtering basic contaminants from a gas and an embedded sensor 270d. In some examples, system 250d may include one or both of embedded sensor 270d and an embedded source 275d, that may be in contact with a surface of basic gas filter 200. In some examples, one or both of an embedded sensor 270d and an embedded source 275d may be part of a PCB, an integrated circuit, or a chip.

Figure 3A:
FIGS. 3A-3C are conceptual diagrams illustrating a cross sectional view of an example article for filtering basic contaminants from a gas.
Figure 3B:
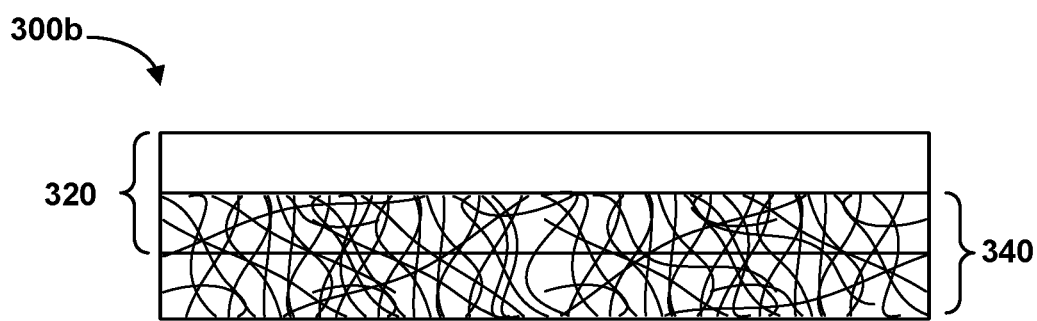
Figure 3C:
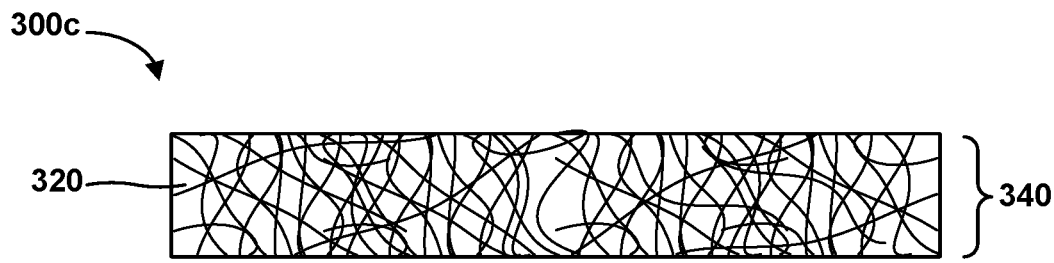

FIGS. 3A-3C are conceptual diagrams illustrating a cross sectional view of an example article for filtering basic contaminants from a gas. As shown in FIG. 3A, an example article 300a includes a substrate 340, and a coating 320 applied to the substrate 340. coating 320 may include a water-soluble polymer and an organic phosphate reactant. The organic phosphate reactant may function as one or more of a cross-linker or a stabilizer, or a proton donor to react with bases. For example, the organic phosphate could be in form of acid, or mono basic, dibasic, multi-basic salt, or organics substitutes. An organic phosphonic acid is preferred, examples of which include phytic acid, amino tris (methylene phosphonic acid) (ATMP), and etidronic acid, with phytic acid and ATMP are preferred. Preferably, the organic phosphate reactant is water soluble. In examples, the organic phosphate reactant includes at least one of phosphoric acid, phytic acid, amino tris(methylene phosphonic acid) (ATMP), and etidronic acid.

Without being bound by theory, the water-soluble polymer may increase the viscosity of the liquid phase to stabilize the coating on the fiber, or serve as sources of surface acidic functional groups including phenolic, lactonic, as well as carboxylic acid functional groups. A polymer, or part of a copolymer that contains hydroxyl groups is preferred. In examples, the water-soluble polymer includes at least one surface acidic functional group. For example, the at least one surface acidic functional group comprises at least one of phenolic, lactonic, or carboxylic acid groups. In examples, the water soluble polymer includes at least one of polyacrylic acid, polyvinyl alcohol, polystyrene sulfonic acid, and poly (2-acrylamido-2-methyl-1-propanesulfonic acid). In examples, the molecular weight of the water-soluble polymer may range from about 30,000 to about 50,000. In an example, the organic phosphate acid reactant comprises phytic acid in a molar ratio with respect to the water-soluble polymer from about 0.1 to about 0.25. For example, the water-soluble polymer may be polyvinyl alcohol, and the ratio of phytic acid to polyvinyl alcohol is about 0.25. the organic phosphate acid reactant comprises amino tris(methylene phosphonic acid) in a molar ratio with respect to the water-soluble polymer from about 0.16 to about 1. For example, the water-soluble polymer may be polyvinyl alcohol, and the molar ratio of ATMP to polyvinyl alcohol is about 1.

In an example, coating 320 includes polyacrylamide, etidronic acid, and a color changing dye. The molecular weight of the polyacrylamide may range from about 1 million to about 50 million. The color changing dye may be selected from a group consisting of cresol red, metanil yellow, m-cresol purple, bromophenol blue, and benzopurpurine 4B.

In examples, coating 320 may include a pH indicator, as described in various examples of coating 120 above with respect to FIG. 1A. In examples, substrate 340 may include substrates similar to those discussed above with respect to substrate 140 of FIG. 1A.

In the example shown in FIG. 3A, coating 320 may be disposed on a major surface of substrate 340. However, as shown in FIG. 3B, an example article 300b may include a coating 320 that at least partly impregnates the substrate 340. For example, coating 320 may enter and occupy a volume within a bulk region of substrate 340. In an example, as shown in FIG. 1C, an example article 300c may include a coating 320 that impregnates a substantial bulk of the substrate 340. For example, in examples where substrate 340 includes a fibrous substrate, coating 320 may completely penetrate the bulk of the substrate 340, and may coat surfaces of fibers of the fibrous substrate.

Articles 300a, 300b, or 300c may be prepared by wet impregnation of coating 320 into substrate 340, followed by drying by air convection. Coating 320 is activated in the course of drying, with activation temperatures that may range from about 100° C. to about 275° C. At temperatures lower than 100° C., polymers such as PVA may not sufficiently crosslink with phosphate reactants. At temperatures higher than 250° C., substrate 140 may get etched or damaged. A preferred activation temperature is within a range of about 125° C. to about 275° C., more preferably about 150 to 180° C. The activation time may range from about 1 minutes to about 1 hour, with the preferred range of activation time ranging from about 1.5 minutes to about 5 minutes.

In examples, coating 320 may be regenerable, and its capacity to capture, filter, absorb, adsorb, or otherwise remove basic gas components from air may be rejuvenated by example techniques described below. Coating 320 may be renegerated by thermal treatment in vacuum, or by thermal treatment within a predetermined gas flow. A regeneration temperature may range from about 70° C. to about 180° C., preferably ranging from about 150° C. to about 180° C. A regeneration temperature of greater than about 100° C. may lead to greater than about 60% regeneration efficiency, while a regeneration temperature of about 170° C. resulting in about 90% regeneration efficiency.

Figure 4:
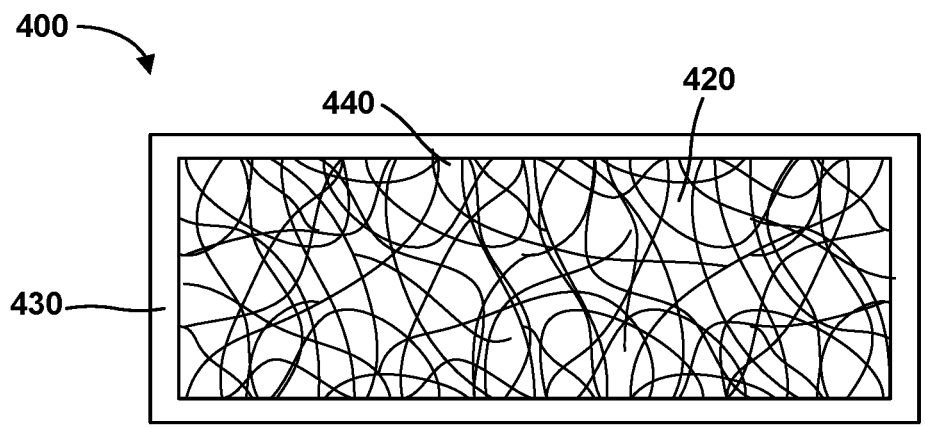
FIG. 4 is a conceptual diagram illustrating a top view of an example basic gas filter for filtering basic contaminants from a gas.

FIG. 4 is a conceptual diagram illustrating a top view of an example basic gas filter for filtering basic contaminants from a gas. In an example, basic gas filter 400 includes a frame 430 holding a substrate 440. A coating 420 is disposed on at least a major surface of the substrate 440. Substrate 440 may include substrate 340 described above with reference to FIG. 3A. Coating 420 may include coating 320 described above with respect to FIG. 3A. In some examples, example systems 250, 250c, or 250d described with reference to FIGS. 2B-2D may include basic gas filter 400 instead of basic gas filter 200.

Figure 5:
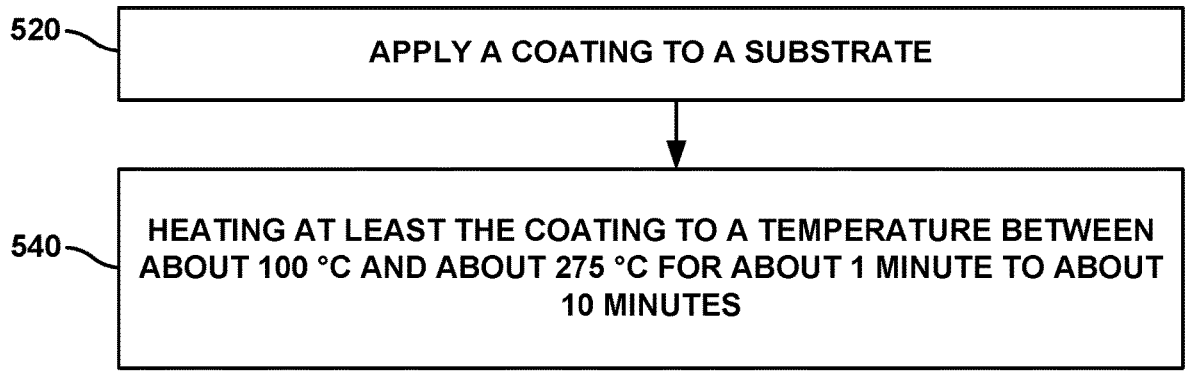
FIG. 5 is a flow diagram illustrating an example technique for preparing an example article for filtering basic contaminants from a gas.

FIG. 5 is a flow diagram illustrating an example technique for preparing an example article for filtering basic contaminants from a gas. The example technique includes applying a coating to a substrate (520). As described with reference to FIGS. 3A-3C above, the applying may include at least partly impregnating a surface of the substrate with the coating. The applying may include impregnating a substantial bulk of the substrate, for example, coating all internal surfaces within the bulk of the substrate. The coating may include example coatings described above with reference to FIGS. 3A-3C. The example technique of FIG. 5 further includes heating at least the coating to a temperature between about 100° C. and about 275° C. for about 1 minute to about 1 hour (540). In examples, the coating is heated at a temperature between about 150° C. and about 180° C. In examples, the coating is heated from about 1.5 minutes to about 5 minutes.

Figure 6:
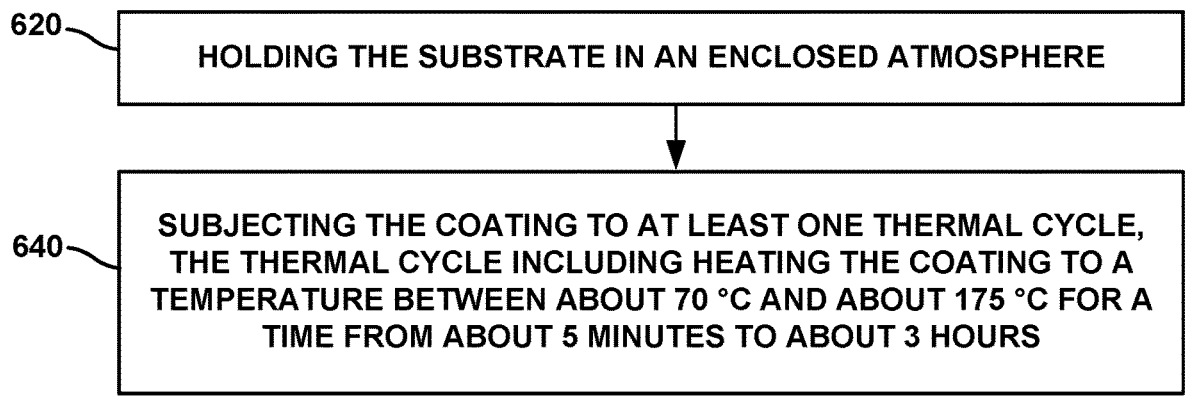
FIG. 6 is a flow diagram illustrating an example technique for regenerating an example article for filtering basic contaminants from a gas.

FIG. 6 is a flow diagram illustrating an example technique for regenerating an example article for filtering basic contaminants from a gas. For example, an example technique for regenerating a basic gas filtration capacity of a coating applied to a substrate may include holding the substrate in an enclosed atmosphere (620). The substrate may be suspended from a frame, by a hook, or by any suitable techniques that allow evenly heating the coating applied to the substrate. The coating may include example coatings described above with reference to FIGS. 3A-3C. The example technique of FIG. 6 includes subjecting the coating to at least one thermal cycle (640). The at least one thermal cycle includes heating the coating to a temperature between about 70° C. and about 175° C. for a time from about 5 minutes to about 3 hours. In examples, the at least one thermal cycle includes heating the coating to a temperature greater than about 100° C., or about 170° C. While the example technique of FIG. 6 may be performed while exposing the coating to a predetermined gas flow, the example of FIG. 6 may be performed substantially at atmospheric pressure, lower than atmospheric pressure, or substantially at vacuum.

Thus, example articles and techniques according to the present disclosure provide filtration of basic gas components from air.

The present disclosure will be illustrated by the following non-limiting examples

EXAMPLES

Example 1

Figure 7:
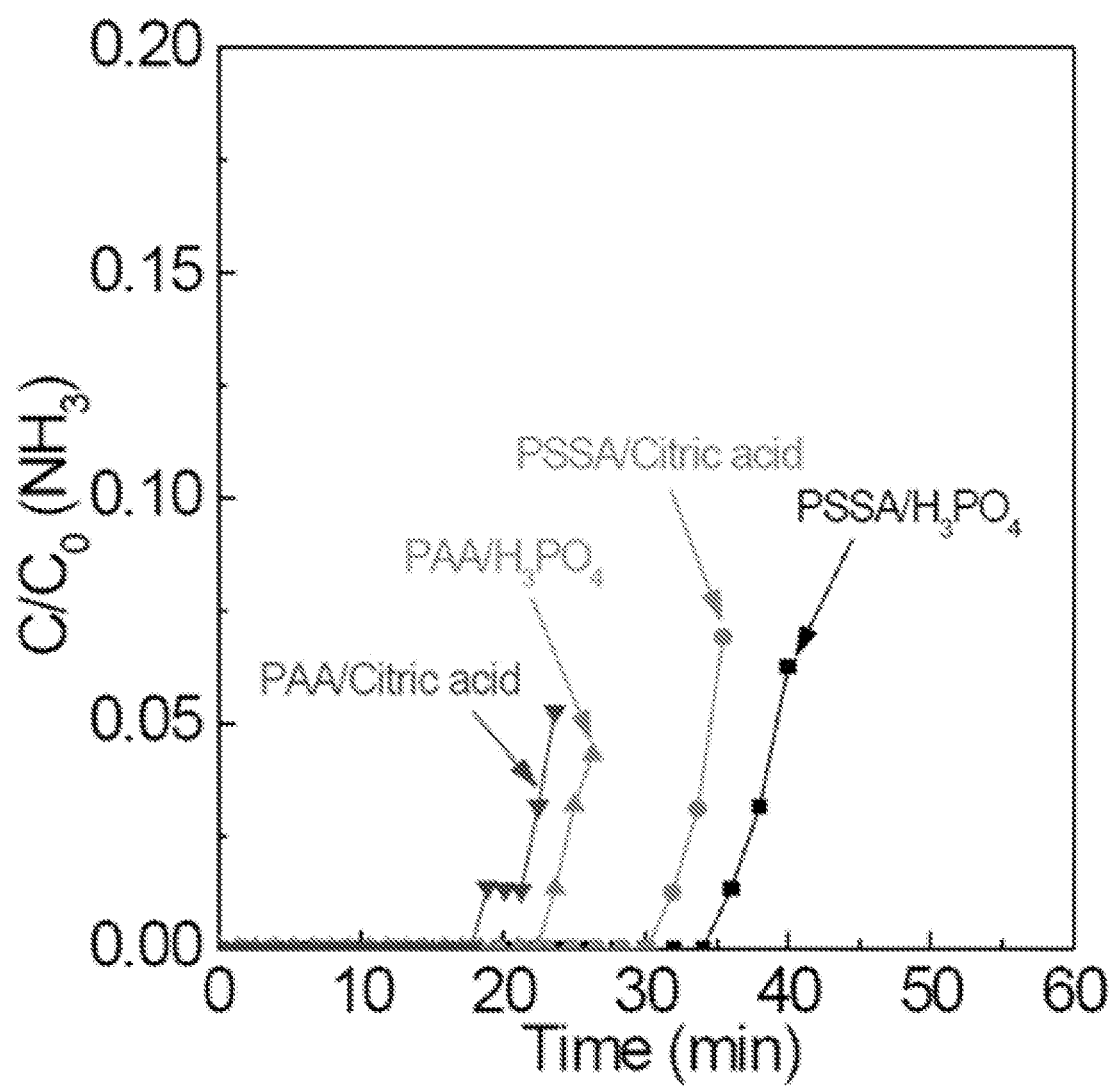
FIG. 7 is a chart illustrating the effect of different coating compositions on basic gas filtration capacity.
Figure 8A:
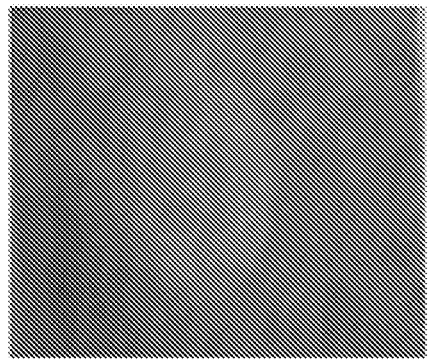
FIGS. 8A-8D are photographs of regions of a coated substrate including pH indicators indicating filtration status.
Figure 8B:
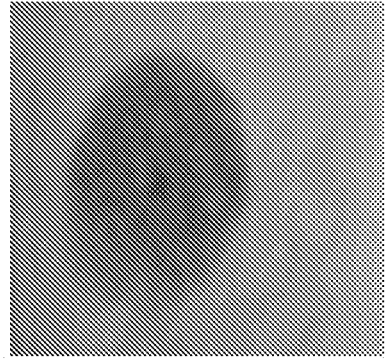
Figure 8C:
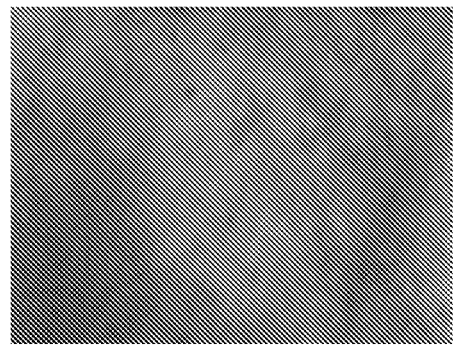
Figure 8D:
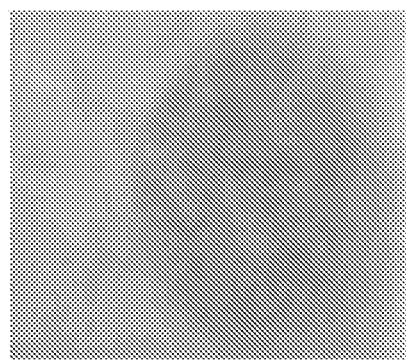

$NH_3$ removal from air was carried out by an acidic media developed by coating a layer of acid materials on a fiber substrate. The effect of coating materials on of $NH_3$ removal performance was studied in the present example. Two cation exchange polymers were used including poly (4-styrene-sulfonic acid) (PSSA) and polyacrylic acid (PAA). Citric acid and phosphoric acid ($H_3PO_4$) were used for $NH_3$ absorption. Two components with 1:1 weight ratio were mixed together and coated onto the glass fiber with about 100% weight gain. Then the fibers were dried at 80° C. for half an hour. For the test, the fiber was cut into small circles with a diameter of 2 inches. The filter contained 5 layers of fiber materials. All the samples were tested at 50% relative humidity, 50 ppm $NH_3$, and 2.6 L/min flow rate. Their performance is shown in FIG. 7. From the breakthrough time, it was seen that the performance of PSSA was better than PAA and that of phosphoric acid was better than that of citric acid. The combination of PSSA and $H_3PO_4$ gave the best performance. PSSA is a strong acid and can effectively react with $NH_3$. Its capacity is better than the weak acid polymer PAA. However, due to its high molecular weight, the capacity of PSSA for $NH_3$ sorption is still low. The small molecular weight acids have high capacity for $NH_3$ absorption. Phosphoric acid is in liquid form, which likely one of the reasons for its better performance than citric acid.

Example 2

Poly(2-acrylamido-2-methyl-1-propanesulfonic acid (PAMPS) was evaluated for basic gas removal performance. PAMPS was found to have a desirable combination of strong acidity, easily variable molecular weight, and relatively low cost. Combinations of PAMPS and $H_3PO_4$ or amino tris (methylene phosphonic acid) (ATMP) were evaluated. 5M PAMPS was used. A nonwoven media S1 made of a thermally carded polyester/polyethylene bicomponent fiber web, was used as a substrate. TABLE 1 presents the $NH_3$ capacities of samples made from PAMPS and $H_3PO_4$ or ATMP with different molar ratios. ATMP showed a lot higher capacity than $H_3PO_4$ when the same molar amount was used in the coating. This result confirmed better performance of ATMP acid. In addition, $H_3PO_4$ is a liquid that could flow within the fiber and wet the fiber. Therefore ATMP was the primary $NH_3$ absorbent in our product. PAMPS in acid form was used to adjust the viscosity of the coating solution. PAMPS could stabilize the ATMP absorbent on the coating. However, PAMPS itself has a lower theoretical capacity (0.082 g $NH_3$/g PAMPS with 100% conversion) than ATMP (~0.17 g $NH_3$/g ATMP with 50% conversion). So the addition of PAMPS could decrease absorption capacity. As such, a minimum amount of PAMPS sufficient to stabilize the coating should be employed. In practice, about 20-30 wt % of PAMPS added to the coating solution was found to result in satisfactory performance.

TABLE 1

| Sample composition (molar ratio) | Sample weight (mg) | Capacity (mg $NH_3$/g fiber) |
|---|---|---|
| PAMPS:H3PO4 = 1:1 | 108.7 | 23.7 |
| PAMPS:H3PO4 = 0.5:1 | 103.0 | 26.2 |
| PAMPS:H3PO4 = 0.2:1 | 94.0 | 28.6 |
| PAMPS:ATMP = 1:1 | 103.0 | 27.9 |
| PAMPS:ATMP = 0.5:1 | 97.7 | 34.1 |
| PAMPS:ATMP = 0.2:1 | 101.3 | 40.9 |

Example 3

The effect of the molecular weight of the PAMPS on $NH_3$ absorption capacity are presented in TABLE 2. The substrate used was Craneglas 230 (19 lbs/1300 ft$^2$).

TABLE 2

| Sample composition (molar ratio) | Sample weight (mg) | Capacity (mg $NH_3$/g fiber) |
|---|---|---|
| PAMPS (5M)/ATMP (0.2:1) | 62.3 | 59.5 |
| PAMPS (10M)/ATMP (0.2:1) | 62.1 | 53.2 |
| PAMPS (17M)/ATMP (0.2:1) | 64.7 | 52.0 |

Example 4

The effect of the substrate used is presented in Table 3. 5M PAMPS was used in combination with ATMP. S1, a nonwoven media made of bicomponent polyester fibers (a thermally carded polyester/polyethylene bicomponent fiber web), showed lower performance than glass fibers, Craneglas 230 (19 lbs/1300 ft$_2$) or Craneglas 232 (39 lbs/1300 ft$^2$), likely because of the larger fiber diameter of S1, and thus less efficient contact with air. However, S1 is also significantly more permeable and lower cost than the glass fiber media, and may be preferred for those reasons.

TABLE 3

| Sample composition (molar ratio) | Substrate | Sample weight (mg) | Capacity (mg $NH_3$/g fiber) |
|---|---|---|---|
| PAMPS:ATMP = 0.2:1 | S1 | 101.3 | 40.9 |
| PAMPS:ATMP = 0.2:1 | CG19 | 62.3 | 59.5 |
| PAMPS:ATMP = 0.2:1 | CG39 | 126.2 | 59.9 |

Example 5

The effect of pH indicators on indicating filter condition, status, or life was evaluated in the present example. Indicators including methyl orange, bromophenol blue, methyl red, and bromocresol green was added to a combination of PSSA/H$_3$PO$_4$ on a substrate and exposed to NH$_3$ gas. As shown in FIGS. 8A-8D, fibers including methyl orange and methyl red had an initial red color, which changed to yellow on NH$_3$ exposure. Bromophenol blue and bromocresol green changed color from yellow to blue, which had better contrast to eyes.

Figure 9A:
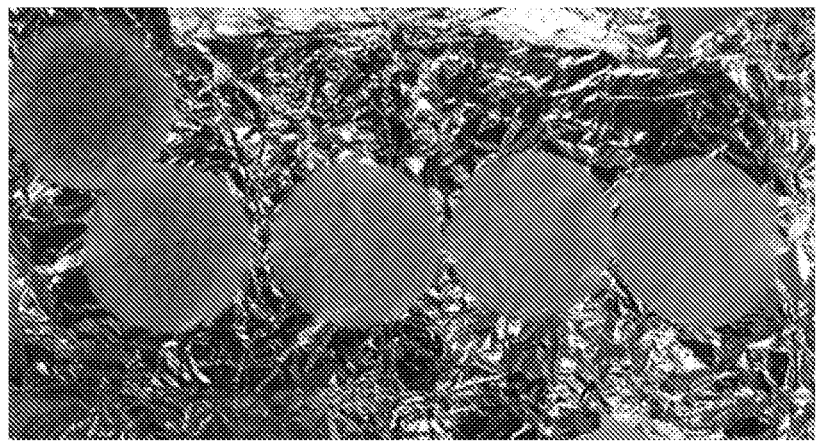
FIGS. 9A-9O are photographs of regions of a coated substrate including pH indicators before and after breakthrough, showing color layer change.
Figure 9B:
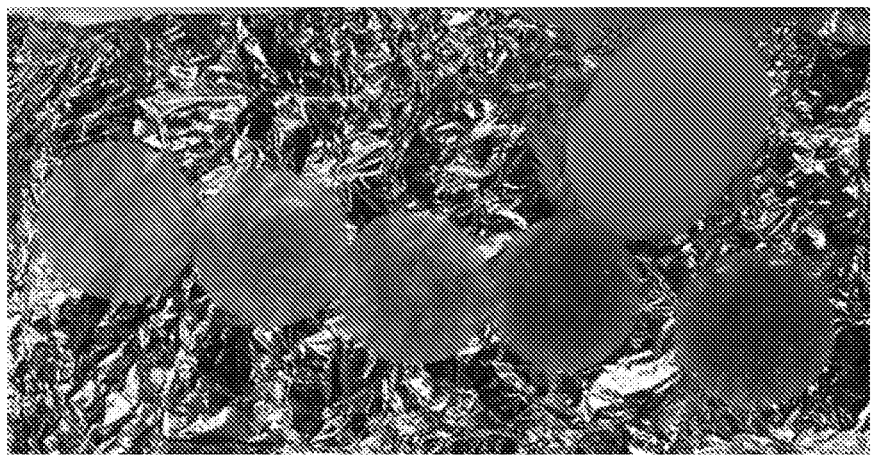
Figure 9C:
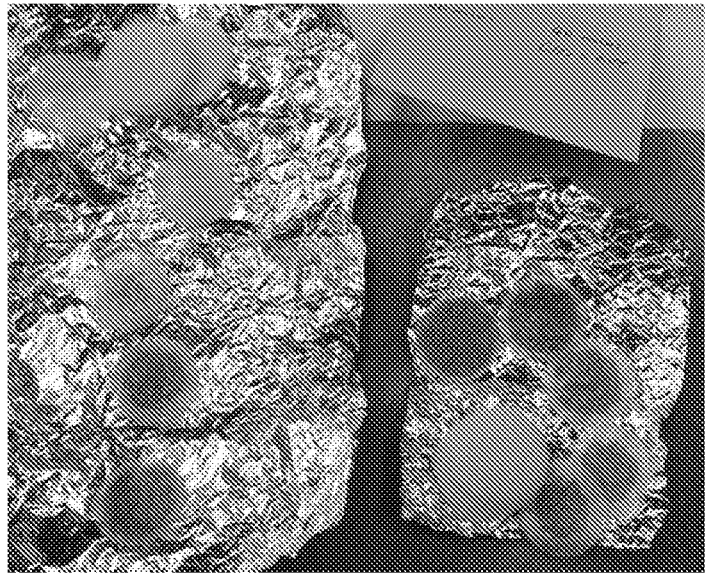

The effect of pH indicators on indicating breakthrough layer change are shown in FIGS. 9A-9C. The coating composition included PAMPS:ATMP in a ratio of 0.2:1, and the substrate included S1.

Example 6

Color stability of various pH indicators were studied in this example. Several candidate pH indicators were evaluated for their stability in the presence of ATMP, PAMPS and ATMP/polyethylene glycol (PEG). PEG was used as a model chemical to represent the hydrolysis product of S1 substrate. The solutions were prepared by mixing small amount of indicator with excess amount of the acids. Then the solutions were treated in an oven at 80° C. for predetermined time periods to observe the color change. Those without color change for three days were considered as stable pH indicators for NH$_3$ removal media.

TABLE 4

| Indicator | pH range | PEG/ATMP | ATMP | PAMPS |
|---|---|---|---|---|
| Bromophenol blue (BPB) | 3.0-4.6 | + | + | + |
| Bromocresol Green (BCG) | 3.8-5.4 | + | + | + |
| Phenol red (PR) | 6.4-8.0 | + | + | + |
| Thymol blue (TB) | 1.2-2.8 | + | + | + |
| Lacmoid | 4.4-6.4 | − | − | − |
| Methyl orange (MO) | 3.2-4.4 | − | 0 | + |
| Methyl red (MR) | 4.4-6.2 | − | + | + |
| 2-(4-Dimethylaminophenylazo) pyridine (PDMA) | 4.4-5.6 | − | − | − |

Note:
+, 0, − means stable, average, unstable respectively.

As shown in Table 4, bromophenol blue, bromocresol green and phenol red showed stable color; almost no color change was observed after 3 days at 80° C. Based on their color change range, both bromophenol blue and bromocresol green could be used which gave blue or green color at breakthrough. Lacmoid and 2-(4-dimethylaminophenylazo) pyridine (PDMA) changed to yellow under all three conditions indicating they were reactive to acids. Thymol blue, methyl orange and methyl red became decolorized only in the presence of PEG. This result suggests that the hydrolysis products of S1 (a thermally carded polyester/polyethylene bicomponent fiber web) may be a cause of the color change. When used as indicator for NH$_3$ removal media, thymol blue remained stable for at least three days at 130° C. Therefore, thymol blue is stable for such chemical environments. It showed a purple color and turned yellow after breakthrough.

Figure 9D:
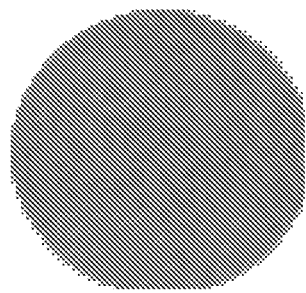
Figure 9E:
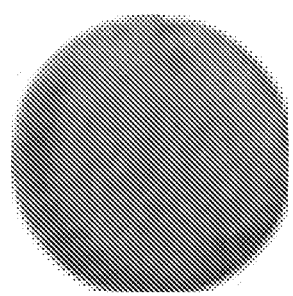

Bromophenol blue and bromocresol green may be used for to impart blue and green colors to media at breakthrough. Using them as secondary indicators may increase the color contrast at breakthrough. A mixture of thymol blue with bromocresol green gave very good contrast. Therefore, thymol blue and bromocresol green with a weight ratio of 3:1 was considered as the best option for the media. FIG. 9D shows the initial purple color, and FIG. 9E shows the greenish color after breakthrough (25 ppm). A capacity of 73.5 mg/g of NH$_3$ was observed, when subjected to 50 ppm of NH$_3$ in air at a flow rate of 2.6 L/min, with a relative humidity of 50%.

Example 7

Stability of the pH indicators in other acid systems was also studied. Citric acid and HEDP were used as primary ammonia absorber. Polyacrylamide (PAM) was added as stabilizer. The weight ratio is PAM:citric acid (or HEDP):dye=0.05:1:0.0005. The coating solution was coated on S1 followed by drying. Samples with different dyes were put in oven at 130° C. for 3 days. Those without significant color change were determined as stable dyes. As shown in Table 5, some dyes were insoluble in the solution such as 4-(phenylazo)diphenylamine, quinaldine red, 4-phenylazo-1-naphthylamine, and 3',3'',5',5''-tetrabromophenolphthalein ethyl ester potassium salt. Some dyes were not stable, such as pyridine-2-azo-p-dimethylaniline, methyl orange, 2-aminoazotoluene, methyl red, tropaeolin 00, and 4-dimethylamino-2-methylazobenzene. Some dyes were stable for use, such as cresol red, metanil yellow, benzopurpurine 4B, bromophenol blue, m-cresol purple, and 4,4'-bis(4-amino-1-naphthylazo)-2,2'-stilbenesulfonic acid. Among them, metanil yellow, bromophenol blue, and m-cresol purple are preferable due to their bright color, color contract, and health safety.

TABLE 5

| Dye | Citric | HEDP | Color | pH range | HMIS |
|---|---|---|---|---|---|
| Cresol red | Stable | Stable | R-Y | 0.0-1.0 | 200 |
| Pyridine-2-azo-p-dimethylaniline | Unstable | Unstable | Y-R | | |
| Metanil yellow | Stable | Stable | R-Y | 1.2-2.4 | 200 |
| Methyl orange | Unstable | Stable | R-Y | 3.2-4.4 | 200 |
| Congo red | Suspected of causing cancer | | B-R | 3.0-5.0 | 200 |
| 2-Aminoazotoluene | Unstable | Unstable | O-Y | 1.4-2.8 | 200 |
| Methyl red | Not so stable | Unstable | R-Y | 4.8-6.0 | 000 |
| Benzopurpurine 4B | Stable | Stable | V-R | 2.2-4.2 | 200 |
| Bromophenol blue | Stable | Stable | Y-B | 3.0-4.6 | 000 |
| 4-(Phenylazo)diphenylamine | Insoluble | Insoluble | R-Y | 1.2-2.6 | 200 |
| Quinaldine red | Insoluble | Insoluble | C-R | 1.4-3.2 | 000 |
| m-Cresol purple | Stable | Stable | R-Y | 1.2-2.8 | 000 |
| Tropaeolin OO | Unstable | Stable | R-Y | 1.4-2.8 | 200 |
| 4-Phenylazo-1-naphthylamine | Insoluble | Insoluble | R-Y | 4.0-5.6 | 100 |
| 4-Dimethylamino-2-methylazobenzene | Stable | Unstable | R-Y | 2.6-4.8 | 100 |
| 4,4'-Bis(4-amino-1-naphthylazo)-2,2'-stilbenesulfonic Acid | Stable | Stable | P-R | 3.0-4.0 | 000 |
| 3',3'',5',5''-Tetrabromophenolphthalein ethyl ester potassium salt | Insoluble | Insoluble | Y-B | 3.0-4.2 | 000 |

Figure 9F:
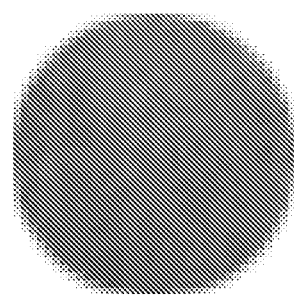
Figure 9G:
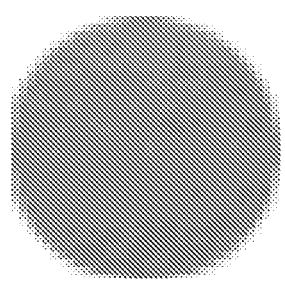
Figure 9H:
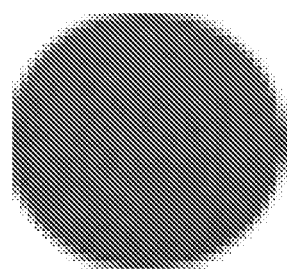
Figure 9I:
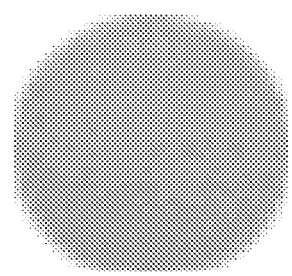
Figure 9J:
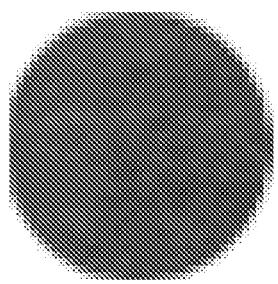
Figure 9K:
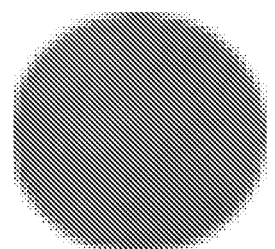
Figure 9L:
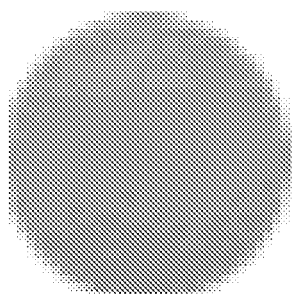
Figure 9M:
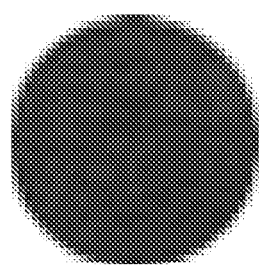
Figure 9N:
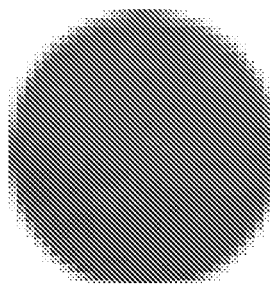
Figure 9O:
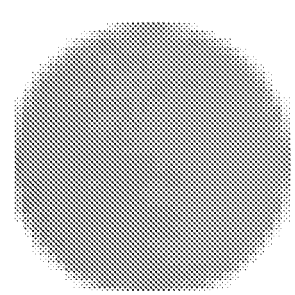

FIGS. 9F-9O show photographs of samples, indicating the original color of the samples, and the color after breakthrough. FIGS. 9F and 9G show samples with cresol red before and after breakthrough. FIGS. 9H and 9I show samples with metanil yellow before and after breakthrough. FIGS. 9J and 9K show samples with benzopurpurine 4B before and after breakthrough. FIGS. 9L and 9M show samples with bromophenol blue before and after breakthrough. FIGS. 9N and 9O show samples with m-cresol purple before and after breakthrough.

Example 8

The effect of stabilizer on coating drifting was evaluated in this example. Several polymers including PAMPS, PNHEA-PAMPS, PAM-PAMPS, and PAM were studied for their capacity to prevent drifting. Experiments was performed by vertically holding a sample of 1×2 inches in a 100% relative humidity chamber for 3 days. Weight loss was calculated by measuring weights of the sample before and after test.

As shown in Table 6, PAMPS can efficiently prevent the drifting of ATMP and PBTC samples. Their weight losses were less than 2%. However, citric acid and HEDP samples shown considerable drifting. Copolymer PNHEA-PAMPS 1:2 was able to lower drifting to less than 2%. This was due to the formation of physical gel upon drying. PAM and copolymer PAM-PAMPS 1:2 could also work well for citric acid sample. HEDP sample showed some weight loss at 100% relative humidity.

TABLE 6

| Sample Composition | Capacity (mg/g) | Weight loss at 100% RH |
|---|---|---|
| PAMPS/Citric acid (0.2:1) | 34.2 | 8.46% |
| PAMPS/ATMP (0.2:1) | 54.7 | 0% |
| PAMPS/HEDP (0.2:1) | 55.1 | 3.83% |
| PAMPS/PBTC (0.2:1) | 39.8 | 1.99% |
| PNHEA:PAMPS 1:2/HEDP (0.2:1) | 45.3 | 1.21% |
| PNHEA-PAMPS 1:2/Citric acid (0.2:1) | 67.2 | 1.45% |
| PAM-PAMPS 1:2/HEDP (0.2:1) | 71.1 | 3.56% |
| PAM-PAMPS 1:2/Citric acid (0.2:1) | 79.6 | 1.30% |
| PAM/HEDP (0.2:1) | 61.3 | 3.60% |
| PAM/Citric acid (0.2:1) | 76.1 | 1.44% |

Example 9

Inorganic particles were evaluated as stabilizer for the coating solutions. Sodium bentonite powder, calcium bentonite powder or silica nanoparticle were added to the coating solution. The weight content of the inorganic particles in the solid coating materials was controlled to be between 5 and 20%. The coating solution was prepared by first mixing PAMPS and citric acid with water to make a 15% solution. Various amounts of sodium or calcium bentonite were added to form a relatively stable suspension. The colloidal silica (LUDOX SM colloidal silica) could form a clear and stable coating solution. After coating onto a nonwoven polyester substrate, the samples were placed in a 100% relative humidity chamber. No drifting was observed even with 5% of inorganic particulates added although the samples were still wet. The result indicated the effectiveness of inorganic particulates to stabilize the coating materials. When the concentration of inorganic particulates was increased, the samples became less moist. With 20% of inorganics, the samples were no longer tacky, and very little material adhered to a probe when the probe contacted the media. Without being bound by theory, this may be because the bentonite formed a strong gel within the coating and significantly increased the viscosity. The colloidal silica also formed a gel upon drying.

Example 10

Figure 10A:
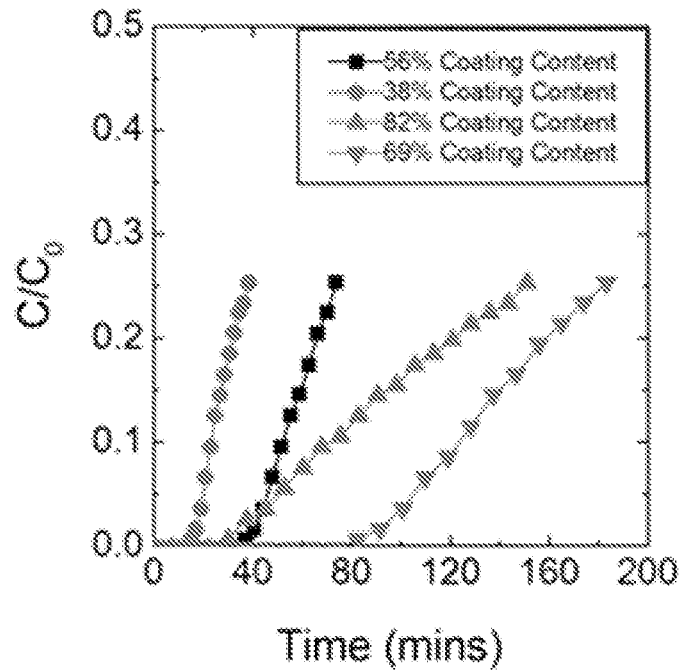
FIG. 10A is a chart illustrating the effect of different coating concentrations on basic gas filtration capacity.
Figure 10B:
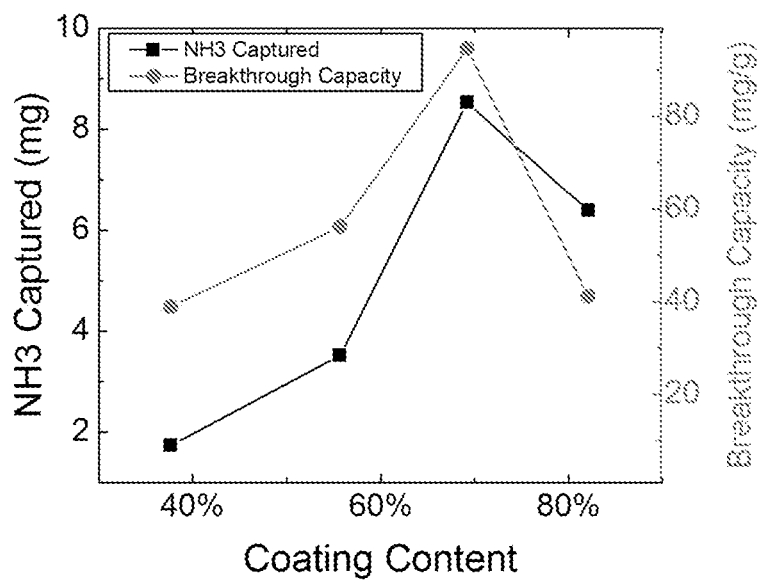
FIG. 10B is a chart illustrating the effect of different coating concentrations on $NH_3$ capture and breakthrough capacity.

Regenerable basic gas removal media were evaluated in the present example. Poly(vinyl alcohol) (PVA) of molecular weight from about 30,000 to about 50,000 was mixed with organic phosphate acid in predetermined ratios to form homogenous water solution. Glass fiber mats were dip-coated into the solution and dried and activated in an air convection oven at 150° C. for 5 min. The coating content was found to influence balance between breakthrough performance, cost, and pressure drop/permeability. The coating content of was tailored by varying the concentration and thus viscosity of dip-coating solutions. The following coating ratios were evaluated for a PVA-phytic acid (IP6) composition: 38%, 56%, 69%, and 82%, the breakthrough characteristics for which are presented in FIGS. 10A and 10B. Material performance was affected by the morphology/structure of the substrate. Four different E-glass fiber media with different thickness, fiber diameter, and porosity were evaluated to evaluate combinations of overall breakthrough performance, pressure drop, and processability. The same solution was chosen and coated on different substrates presented in TABLE 7 below. S1 media was also used for comparison.

TABLE 7

| Item | Basis Weight lbs/1300 ft² (g/m2) | Web Thickness Inch (mm) | Porosity @ 0.5" water cfm/ft² (m/s) | Fiber Diameter μm |
|---|---|---|---|---|
| Crane230 6.1 | 6.1 (23) | 0.005 (0.13) | 690 (3.5) | 6.5 |
| Crane232 39 | 39 (147) | 0.03 (0.76) | 190 (0.96) | 6.5 |
| Crane330 30 | 30 (113) | 0.04 (1.07) | Not reported | >10 |
| Crane330 45 | 45 (169) | 0.06 (1.60) | Not reported | >10 |

Example 11

Figure 11A:
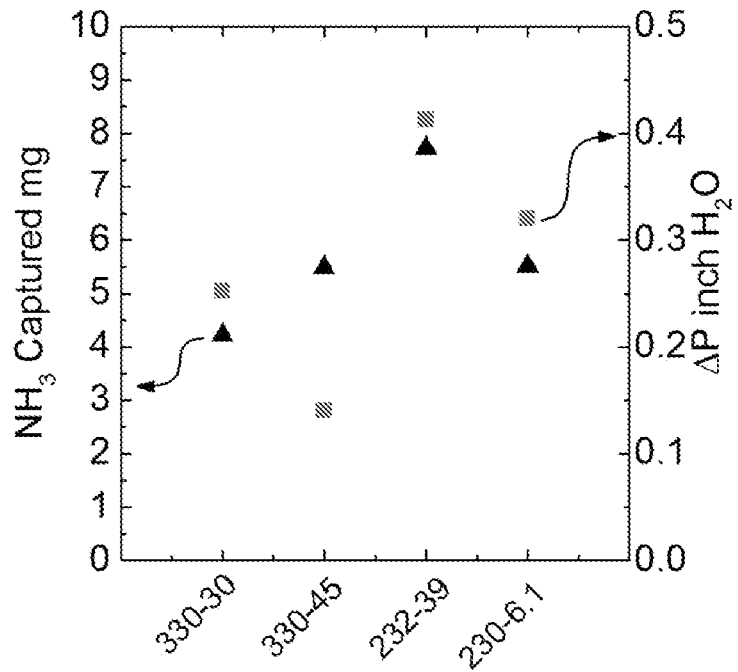
FIG. 11A is a chart illustrating the effect of different substrates on $NH_3$ capture capacity and pressure drop.
Figure 11B:
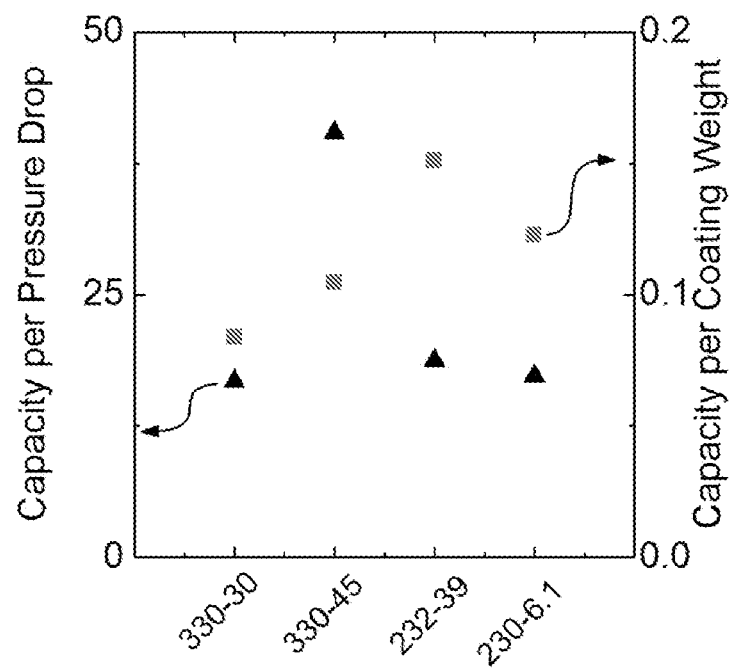
FIG. 11B is a chart illustrating the effect of different coating concentrations on capacity per pressure drop and capacity per coating weight.

The effect of the substrate on breakthrough and pressure drop was evaluated in this example. A solution composition was chosen (IP6:PVA=0.25) and coated on four different substrates. Breakthrough capacity (indicated by the amount of $NH_3$ captured by one layer of media; 5 layers for the lighter Crane230-6.1), capacity per coating weight, pressure drop (AP), and capacity per unit of pressure drop have been tested and/or derived to compare effects of different substrates, as shown in FIGS. 11A and 11B. As seen in FIGS. 11A and 11B, the performance of different substrates was different with respect to different categories. With respect to capacity, the Crane232 39 substrate was better than the Crane230 6.1 and Crane330 45 substrates, both of which had similar capacities. The Crane330 30 substrate had the lowest capacity. With respect to capacity/coating weight, the Crane232 39 substrate was better than the Crane230 6.1 substrate, which was better than the Crane330 45 substrate, which was better than the Crane330 30 substrate. In terms of pressure drop, the Crane 330 45 substrate had the lowest pressure drop, and was better than the Crane330 30 substrate, which was better than the Crane230 6.1 substrate, which was better than the Crane232 39 substrate. With respect to capacity/pressure drop, the Crane 330 45 substrate was better than both Crane232 39 and Crane 230 6.1 substrates, which were better than the Crane330 30 substrate.

Example 12

Figure 12:
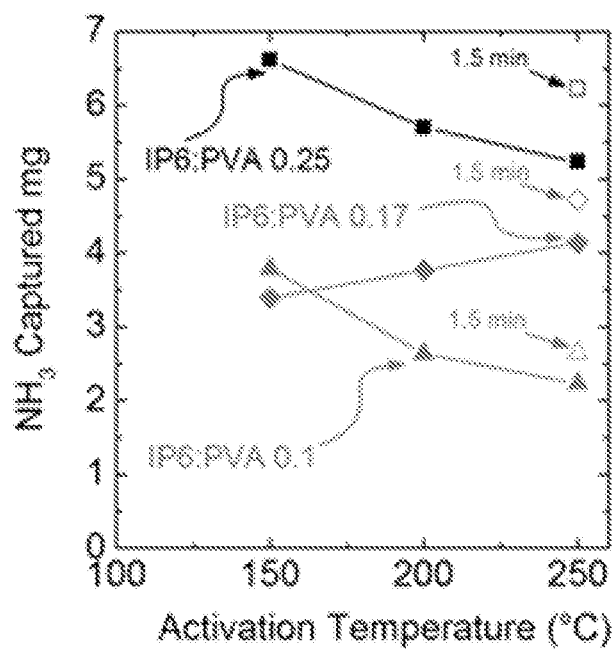
FIG. 12 is a chart illustrating the effect of different activation temperatures and times on $NH_3$ capture capacity of phytic acid/polyvinyl alcohol coatings.

The breakthrough capacities of PVA-phytic acid coatings of different compositions were evaluated, when coated on Crane 230, and challenged with 50 ppm of $NH_3$, as presented in FIG. 12. IP6:PVA=0.25 exhibited the highest adsorption capacity. The activation temperature had different effects on breakthrough performance at different acid ratios. In FIG. 12, the open symbols correspond to 1.5 min activation while the solid symbol data points correspond with 5 min activation time. Decreasing activation time from 5 min to 1.5 min may further improve adsorption capacity. A brief 1.5 min activation at 250° C. maintained the materials' physical integrity, as gauged by visual inspection.

Example 13

Figure 13:
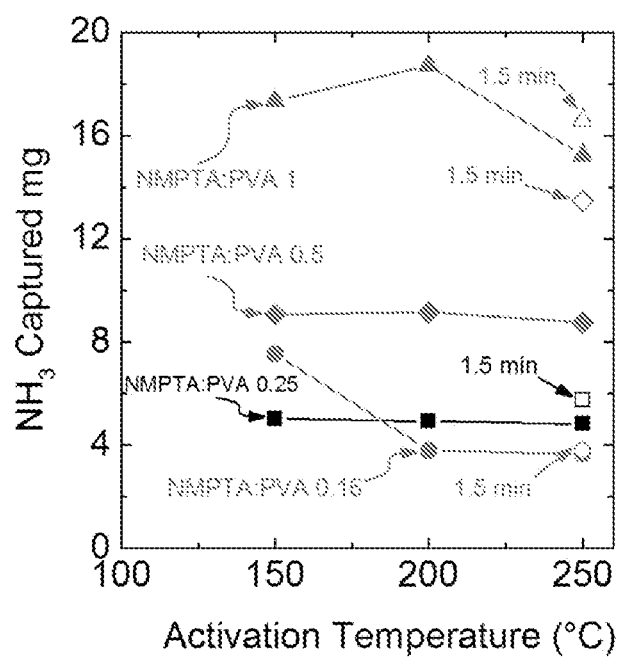
FIG. 13 is a chart illustrating the effect of different activation temperatures and times on $NH_3$ capture capacity of ATMP/polyvinyl alcohol coatings.

The breakthrough capacities of PVA-ATMP coatings of different compositions were evaluated, when coated on Crane230, and challenged with 50 ppm of $NH_3$, as presented in FIG. 13. In FIG. 13, the open symbols correspond to 1.5 min activation while the solid symbol data points correspond to 5 min activation time. Results show that ATMP:PVA=1 exhibits the highest adsorption capacity up to 12% w/w with 200° C. activation. Activation temperature was not observed to significantly influence breakthrough performance.

Example 14

Figure 14A:
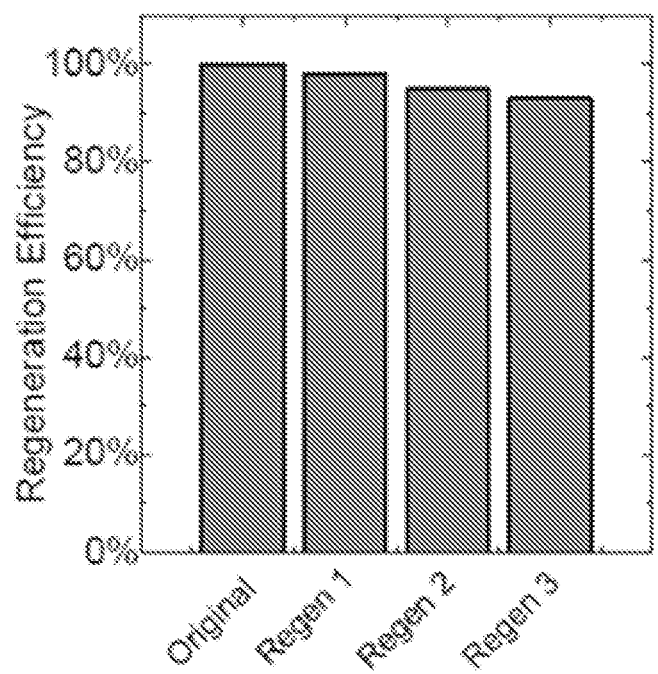
FIG. 14A is a chart illustrating the regeneration efficiencies for phytic acid/polyvinyl alcohol compositions activated for 1.5 minutes at 250° C. at successive stages of regeneration.
Figure 14B:
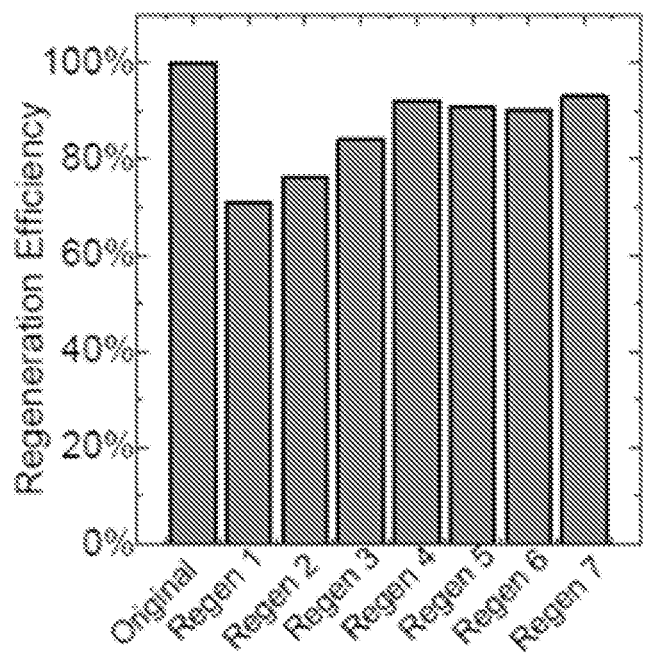
FIG. 14B is a chart illustrating the regeneration efficiencies for phytic acid/polyvinyl alcohol compositions activated for 5 minutes at 250° C. at successive stages of regeneration.

PVA-phytic acid ACFCs were evaluated for regeneration performance. A flow rate of 4 L/min was used to deliver regeneration temperature of approximately 150° C. Under this condition, as shown in FIGS. 14A (1.5 min activation) and 22B (5 min activation), both the PVA-IP6-ACFCs activated at 250° C. for 1.5 min and 5 min displayed >90% regeneration efficiency after several regeneration cycles. The low initial regeneration in FIG. 14B is attributed to incomplete heating of the sample in the initial cycles.

Example 15

Figure 15:
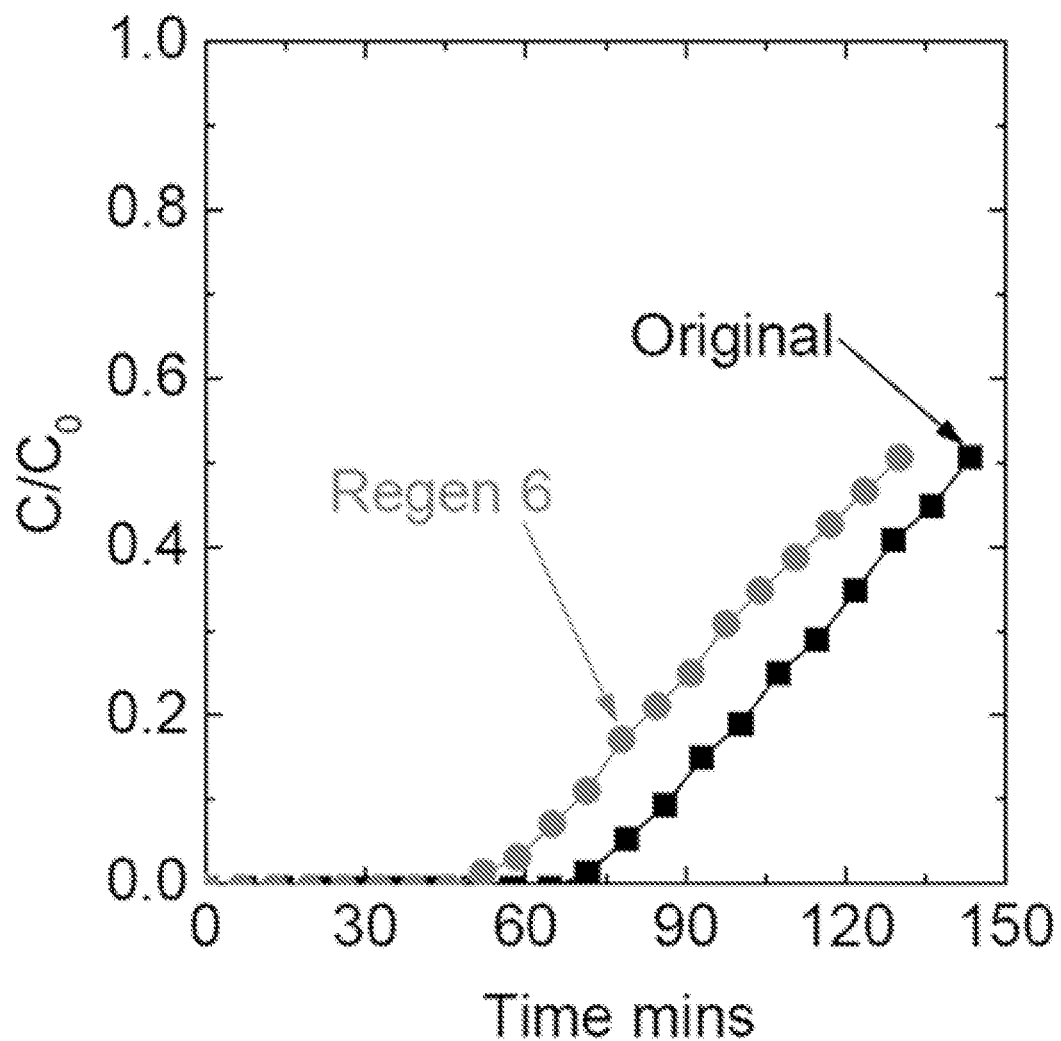
FIG. 15 is a chart illustrating the regeneration breakthrough performance for ATMP/polyvinyl alcohol compositions.

PVA-ATMP ACFCs were evaluated for regeneration performance. Samples of the PVA-ATMP ACFC with ATMP:PVA 1:1 ratio, and 200° C. activation temperature were selected and tested for regeneration performance. The in-situ regeneration temperature was approximately 150° C. The final regeneration was carried out in a 170° C. air convection oven for 2 hrs for a more uniform temperature profile. Under this condition, as shown in FIG. 15, the PVA-ATMP-ACFC displayed exceptional first-pass (about 9.2% w/w) and regeneration capacity (i.e. over 8.1% w/w, about 90% regeneration efficiency) after 6 regeneration cycles.

Example 16

Figure 16:
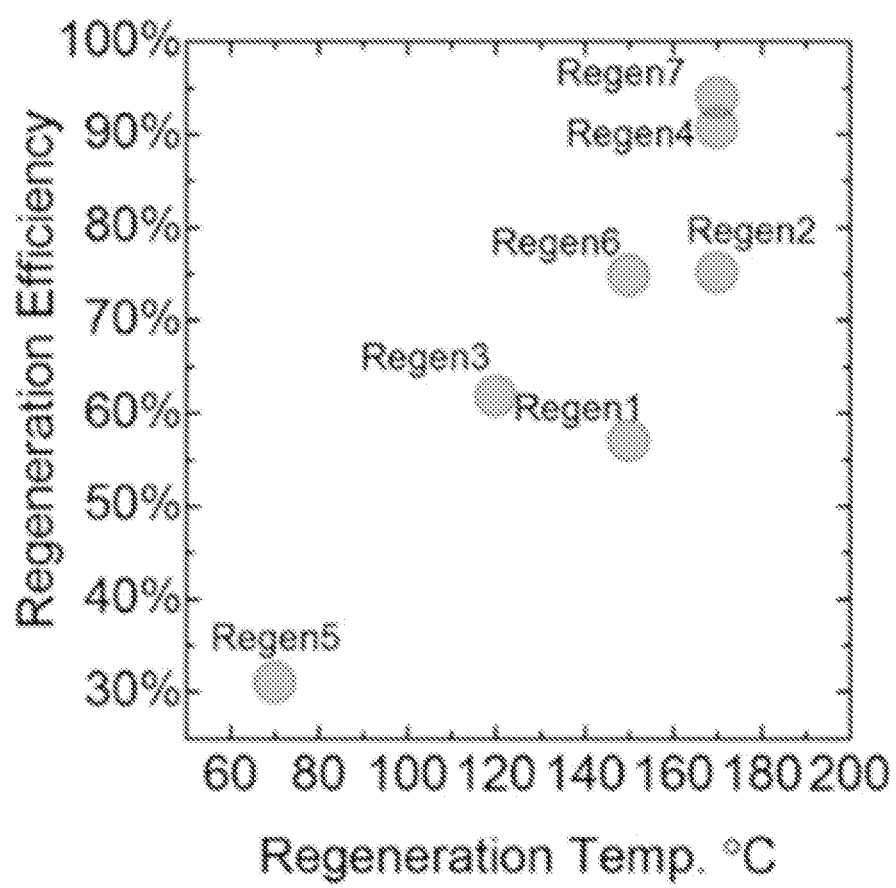
FIG. 16 is a chart illustrating the regeneration efficiency after different regeneration thermal cycles.

Regeneration temperatures were evaluated. The original PVA-ATMP showed 70.3 mg/g adsorption capacity, suggesting a scalable synthesis route. FIG. 16 is a plot of regeneration efficiency as a function of regeneration temperatures. As shown in FIG. 16, at regeneration temperatures from 70 to 170° C., adsorption capacity could be retained from 30% to 94%, respectively. More regeneration cycles may improve adsorption capacity, possibly due to an increase in surface oxygen groups generated during regeneration at high temperature.

Example 17

Figure 17:
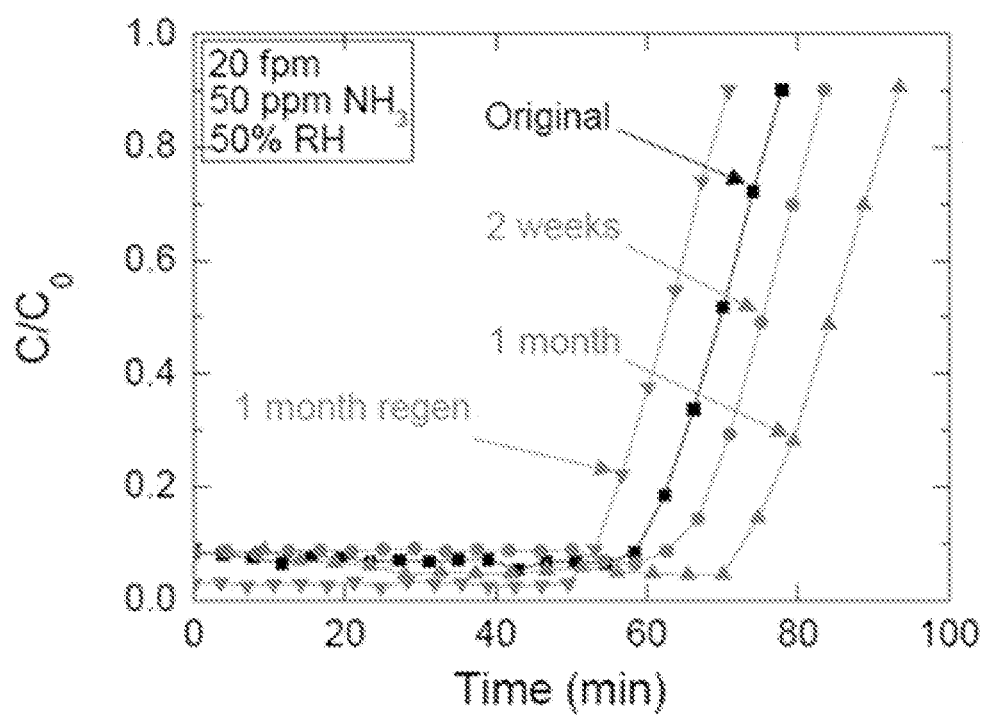
FIG. 17 is a chart illustrating the effect of aging on $NH_3$ capture capacity.

The long term stability of coatings were evaluated. Residual acid on the surface might cause concerns regarding the stability of an adsorbent over time. In order to test long term stability, PVA-IP6 samples with different aging time (original, 2 weeks, and 1 month) were selected for $NH_3$ breakthrough test. In addition, samples of the 1-month aged PVA-IP6 ACFCs were also selected and tested for regeneration performance. After the breakthrough test, the exhausted sample was heated at 170° C. in air convection oven for 2 hours for regeneration. Breakthrough performances of different samples are summarized in FIG. 17. FIG. 17 is a plot of capacity as a function of time, for samples aged up to 1 month.

As shown in FIG. 17, after exposing to air for 2 weeks and 1 month, samples showed unchanged or slightly improved adsorption capacity from 6% w/w to 7% w/w. These slight differences could be explained by uneven coating of different parts of the sample. In addition, PVA-IP6 ACFCs also displayed exceptional regenerable capacity of over 6.1% w/w, which represents about 86% regeneration efficiency compared with a 1-month sample, on a weight basis). In addition, all samples showed sharp take-off, illustrating the superior mass transfer of ACFCs compared with conventional adsorbents.

Example 18

PAMPS and ATMP were evaluated for removal of pet-related odors from air. An gas filter comprising S1 substrate coated with a coating comprising PAMPS, ATMP, and a pH-indicating dye was placed in a room with an offensive odor characteristic of cat urine and cat marking stains. Air was forcibly passed through the gas filter, and after passing through the filter, the air was found to be substantially free from the malodors characteristic of cat urine and cat marking stains.

Various examples of the invention have been described. These and other examples are within the scope of the following claims.

What is claimed is:

1. An article comprising a filter configured to filter basic contaminants from a gas, the filter comprising:
    a substrate; and
    a coating applied to the substrate,
    wherein the coating comprises at least one stabilizer, at least one monomeric organic acid reactant, and at least one pH indicator,
    wherein the at least one pH indicator comprises m-cresol purple,
    and wherein the at least one stabilizer comprises a polymer comprising a 2-acrylamido-2-methyl-1-propanesulfonic acid monomer.

2. The article of claim 1, wherein the at least one monomeric organic acid reactant comprises one or both of citric acid and malonic acid.

3. The article of claim 1, wherein the polymer is poly(2-acrylamido-2-methyl-1-propanesulfonic acid).

4. The article of claim 1, wherein the at least one stabilizer further comprises at least one of polyacrylic acid, polyvinyl alcohol, polystyrene sulfonic acid, polyacrylamide, polyvinylphosphonic acid, poly(N-hydroxyethylacrylamide), and copolymers thereof, carboxymethylcellulose, hydroxypropylcellulose, and xanthan gum.

5. The article of claim 1, wherein the polymer is a copolymer comprising at least the 2-acrylamido-2-methyl-1-propanesulfonic acid monomer.

6. The article of claim 1, further comprising a preservative, wherein the preservative comprises dehydroacetic acid.

7. The article of claim 1, wherein the at least one pH indicator further comprises one or both of cresol red and bromocresol green.

8. The article of claim 1, wherein the at least one stabilizer further comprises an inorganic stabilizer.

9. The article of claim 8, wherein the inorganic stabilizer comprises a clay.

10. The article of claim 9, wherein the clay comprises one or both of montmorillonite or bentonite.

11. A system comprising:
a filter comprising a coating on a substrate, wherein the coating comprises at least one stabilizer, at least one monomeric organic acid reactant, and at least one pH indicator; and
a sensor configured to sense an optical change in the coating and generate a signal indicative of the optical change,
wherein the at least one pH indicator comprises one or both of m-cresol purple and thymol blue,
and wherein the at least one stabilizer comprises a polymer comprising a 2-acrylamido-2-methyl-1-propanesulfonic acid monomer.

12. The system of claim 11, wherein the coating comprises a dye.

13. The system of claim 11, wherein the at least one pH indicator further comprises one or both of cresol red and bromocresol green.

14. The system of claim 11, wherein the at least one monomeric organic acid reactant comprises one or both of citric acid and malonic acid.

15. The system of claim 11, wherein the polymer comprises poly (2-acrylamido-2-methyl-1-propanesulfonic acid) or a copolymer comprising at least the 2-acrylamido-2-methyl-1-propanesulfonic acid monomer.

16. The system of claim 11, wherein the coating further comprises a preservative, wherein the preservative comprises dehydroacetic acid.

17. The system of claim 11, wherein the at least one stabilizer further comprises an inorganic stabilizer.

18. The system of claim 17, wherein the inorganic stabilizer comprises a clay.

19. The system of claim 18, wherein the clay comprises one or both of montmorillonite or bentonite.

20. An article comprising a filter configured to filter basic contaminants from a gas, the filter comprising:
a substrate; and
a coating applied to the substrate,
wherein the coating comprises at least one stabilizer, at least one monomeric organic acid reactant, and at least one pH indicator,
wherein the at least one pH indicator comprises one or both of m-cresol purple and thymol blue,
and wherein the at least one stabilizer comprises a polymer comprising a 2-acrylamido-2-methyl-1-propanesulfonic acid monomer.

* * * * *